US010311464B2

(12) United States Patent
Rao et al.

(10) Patent No.: US 10,311,464 B2
(45) Date of Patent: Jun. 4, 2019

(54) METHODS AND APPARATUS TO DETERMINE IMPRESSIONS CORRESPONDING TO MARKET SEGMENTS

(71) Applicant: The Nielsen Company (US), LLC, New York, NY (US)

(72) Inventors: Kumar Nagaraja Rao, Fremont, CA (US); Stephen S. Bell, McHenry, IL (US); Tianjue Luo, Sunnyvale, CA (US); Darlene F. DeMay, Indian Rocks Beach, FL (US)

(73) Assignee: The Nielsen Company (US), LLC, New York, NY (US)

( * ) Notice: Subject to any disclaimer, the term of this patent is extended or adjusted under 35 U.S.C. 154(b) by 707 days.

(21) Appl. No.: 14/729,870

(22) Filed: Jun. 3, 2015

(65) Prior Publication Data
US 2016/0019580 A1 Jan. 21, 2016

Related U.S. Application Data

(60) Provisional application No. 62/117,253, filed on Feb. 17, 2015, provisional application No. 62/026,001, filed on Jul. 17, 2014.

(51) Int. Cl.
G06Q 30/02 (2012.01)
(52) U.S. Cl.
CPC ..... G06Q 30/0242 (2013.01); G06Q 30/0267 (2013.01); G06Q 30/0277 (2013.01)
(58) Field of Classification Search
CPC .................. G06Q 30/0207–30/0277
See application file for complete search history.

(56) References Cited

U.S. PATENT DOCUMENTS 5,584,050 A 12/1996 Lyons
5,594,934 A 1/1997 Lu et al.
(Continued)

FOREIGN PATENT DOCUMENTS

AU 2013205736 5/2013
CN 1898662 1/2007
(Continued)

OTHER PUBLICATIONS

Mobile Internet Monetization, Hermet et al., 2011 10th International Conference on Mobile Business, IEEE Computer Society.*
(Continued)

Primary Examiner — David J Stoltenberg
(74) Attorney, Agent, or Firm — Hanley, Flight & Zimmerman, LLC

(57) ABSTRACT

Methods and apparatus to determine impression corresponding to market segments are disclosed. An example method includes determining a number of impressions that occurred on mobile devices and that are attributable to a first demographic group, where the number of impressions are based on attributions of the impressions to the first demographic group. The example method also includes determining whether a size of a first audience that corresponds to the first demographic group satisfies a threshold, where the first audience includes panelists in an audience measurement panel. The example method further includes determining whether a size of a second audience satisfies the threshold when the size of the first audience does not satisfy the threshold, where the second audience includes panelists in the audience measurement panel that correspond to a second demographic group and the first audience is a subset of the second audience. The method further includes calculating impressions attributable to a market segment and to the second demographic group when the second size of the (Continued)

second audience satisfies the threshold based on a portion of the second audience that belongs to the market segment.

20 Claims, 7 Drawing Sheets

(56) References Cited

U.S. PATENT DOCUMENTS

| | | |
|---|---|---|
| 5,675,510 A | 10/1997 | Coffey et al. |
| 5,796,952 A | 8/1998 | Davis et al. |
| 5,832,520 A | 11/1998 | Miller |
| 5,848,396 A | 12/1998 | Gerace |
| 5,870,740 A | 2/1999 | Rose et al. |
| 5,948,061 A | 9/1999 | Merriman et al. |
| 6,035,339 A | 3/2000 | Agraharam et al. |
| 6,052,730 A | 4/2000 | Felciano et al. |
| 6,055,573 A | 4/2000 | Gardenswartz et al. |
| 6,098,093 A | 8/2000 | Bayeh et al. |
| 6,102,406 A | 8/2000 | Miles et al. |
| 6,108,637 A | 8/2000 | Blumenau |
| 6,138,155 A | 10/2000 | Davis et al. |
| 6,141,694 A | 10/2000 | Gardner |
| 6,223,215 B1 | 4/2001 | Hunt et al. |
| 6,279,036 B1 | 8/2001 | Himmel et al. |
| 6,286,140 B1 | 9/2001 | Ivanyi |
| 6,415,323 B1 | 7/2002 | McCanne et al. |
| 6,434,614 B1 | 8/2002 | Blumenau |
| 6,457,010 B1 | 9/2002 | Eldering et al. |
| 6,460,079 B1 | 10/2002 | Blumenau |
| 6,529,952 B1 | 3/2003 | Blumenau |
| 6,606,657 B1 | 8/2003 | Zilberstein et al. |
| 6,658,410 B1 | 12/2003 | Sakamaki et al. |
| 6,704,787 B1 | 3/2004 | Umbreit |
| 6,714,917 B1 | 3/2004 | Eldering et al. |
| 6,839,680 B1 | 1/2005 | Liu et al. |
| 6,877,007 B1 | 4/2005 | Hentzel et al. |
| 6,993,590 B1 | 1/2006 | Gauthier et al. |
| 7,039,699 B1 | 5/2006 | Narin et al. |
| 7,092,926 B2 | 8/2006 | Cerrato |
| 7,139,723 B2 | 11/2006 | Conkwright et al. |
| 7,146,329 B2 | 12/2006 | Conkwright et al. |
| 7,150,030 B1 | 12/2006 | Eldering et al. |
| 7,152,074 B2 | 12/2006 | Dettinger et al. |
| 7,159,023 B2 | 1/2007 | Tufts |
| 7,181,412 B1 | 2/2007 | Fulgoni et al. |
| 7,260,837 B2 | 8/2007 | Abraham et al. |
| 7,272,617 B1 | 9/2007 | Bayer et al. |
| 7,302,447 B2 | 11/2007 | Dettinger et al. |
| 7,343,417 B2 | 3/2008 | Baum |
| 7,363,643 B2 | 4/2008 | Drake et al. |
| 7,386,473 B2 | 6/2008 | Blumenau |
| 7,406,516 B2 | 7/2008 | Davis et al. |
| 7,546,370 B1 | 6/2009 | Acharya et al. |
| 7,590,568 B2 | 9/2009 | Blumenau |
| 7,613,635 B2 | 11/2009 | Blumenau |
| 7,634,786 B2 | 12/2009 | Knee et al. |
| 7,644,156 B2 | 1/2010 | Blumenau |
| 7,647,418 B2 | 1/2010 | Ash et al. |
| 7,650,407 B2 | 1/2010 | Blumenau |
| 7,653,724 B2 | 1/2010 | Blumenau |
| 7,716,326 B2 | 5/2010 | Blumenau |
| 7,720,963 B2 | 5/2010 | Blumenau |
| 7,720,964 B2 | 5/2010 | Blumenau |
| 7,756,974 B2 | 7/2010 | Blumenau |
| 7,788,216 B2 | 8/2010 | Li et al. |
| 7,882,054 B2 | 2/2011 | Levitan |
| 7,882,242 B2 | 2/2011 | Chen |
| 7,890,451 B2 | 2/2011 | Cancel et al. |
| 7,925,694 B2 | 4/2011 | Harris |
| 7,941,525 B1 | 5/2011 | Yavilevich |
| 7,949,565 B1 | 5/2011 | Eldering et al. |
| 7,949,639 B2 | 5/2011 | Hunt et al. |
| 7,958,234 B2 | 6/2011 | Thomas et al. |
| 7,962,603 B1 | 6/2011 | Morimoto |
| 8,006,259 B2 | 8/2011 | Drake et al. |
| 8,046,255 B2 | 10/2011 | Bistriceanu et al. |
| 8,060,601 B1 | 11/2011 | Brown et al. |
| 8,087,041 B2 | 12/2011 | Fu et al. |
| 8,131,763 B2 | 3/2012 | Tuscano et al. |
| 8,131,861 B2 | 3/2012 | Butler et al. |
| 8,151,194 B1 | 4/2012 | Chan et al. |
| 8,180,112 B2 | 5/2012 | Kurtz et al. |
| 8,229,780 B2 | 7/2012 | Davidow et al. |
| 8,235,814 B2 | 8/2012 | Willis et al. |
| 8,266,687 B2 | 9/2012 | Baldry |
| 8,271,886 B2 | 9/2012 | Lee et al. |
| 8,280,683 B2 | 10/2012 | Finkler |
| 8,302,120 B2 | 10/2012 | Ramaswamy |
| 8,307,006 B2 | 11/2012 | Hannan et al. |
| 8,370,489 B2 | 2/2013 | Mazumdar et al. |
| 8,412,648 B2 | 4/2013 | Karypis et al. |
| 8,453,173 B1 | 5/2013 | Anderson et al. |
| 8,484,511 B2 | 7/2013 | Tidwell et al. |
| 8,495,198 B2 | 7/2013 | Sim et al. |
| 8,504,411 B1 | 8/2013 | Subasic et al. |
| 8,504,507 B1 | 8/2013 | Srinivasaiah |
| 8,543,454 B2 | 9/2013 | Fleischman et al. |
| 8,549,552 B2 | 10/2013 | Ramaswamy et al. |
| 8,600,796 B1 | 12/2013 | Sterne et al. |
| 8,631,122 B2 | 1/2014 | Kadam et al. |
| 8,688,524 B1 | 4/2014 | Ramalingam et al. |
| 8,700,457 B2 | 4/2014 | Craft |
| 8,713,168 B2 | 4/2014 | Heffernan et al. |
| 8,751,461 B2 | 6/2014 | Abraham et al. |
| 8,775,332 B1 | 7/2014 | Morris et al. |
| 8,831,362 B1 | 9/2014 | Steffens |
| 8,843,626 B2 | 9/2014 | Mazumdar et al. |
| 8,898,689 B2 | 11/2014 | Georgakis |
| 8,909,771 B2 | 12/2014 | Heath |
| 8,910,195 B1 | 12/2014 | Barney et al. |
| 8,930,701 B2 | 1/2015 | Burbank et al. |
| 8,954,536 B2 | 2/2015 | Kalus et al. |
| 8,973,023 B1 | 3/2015 | Rao et al. |
| 8,984,547 B2 | 3/2015 | Lambert et al. |
| 9,055,122 B2 | 6/2015 | Grecco et al. |
| 9,117,217 B2 | 8/2015 | Wilson et al. |
| 2002/0099609 A1 | 7/2002 | Nascenzi et al. |
| 2003/0006911 A1 | 1/2003 | Smith et al. |
| 2003/0037131 A1 | 2/2003 | Verma |
| 2003/0046385 A1 | 3/2003 | Vincent |
| 2003/0065770 A1 | 4/2003 | Davis et al. |
| 2003/0074252 A1 | 4/2003 | Chandler-Pepelnjak et al. |
| 2003/0105604 A1 | 6/2003 | Ash et al. |
| 2003/0177488 A1 | 9/2003 | Smith et al. |
| 2003/0220901 A1 | 11/2003 | Carr et al. |
| 2004/0088212 A1 | 5/2004 | Hill |
| 2004/0107125 A1 | 6/2004 | Guheen et al. |
| 2004/0167763 A1 | 8/2004 | Liebman |
| 2004/0167928 A1 | 8/2004 | Anderson et al. |
| 2004/0186840 A1 | 9/2004 | Dettinger et al. |
| 2005/0166233 A1 | 7/2005 | Beyda et al. |
| 2005/0223093 A1 | 10/2005 | Hanson et al. |
| 2006/0074953 A1 | 4/2006 | Dettinger et al. |
| 2006/0089754 A1 | 4/2006 | Mortenson |
| 2006/0178996 A1 | 8/2006 | Matsushima et al. |
| 2006/0271641 A1 | 11/2006 | Stavrakos et al. |
| 2006/0294259 A1 | 12/2006 | Matefi et al. |
| 2007/0043769 A1 | 2/2007 | Kasahara et al. |
| 2007/0106787 A1 | 5/2007 | Blumenau |
| 2007/0106792 A1 | 5/2007 | Blumenau |
| 2007/0112714 A1 | 5/2007 | Fairweather |
| 2007/0156532 A1 | 7/2007 | Nyhan et al. |
| 2007/0198327 A1 | 8/2007 | Yazdani et al. |
| 2007/0260603 A1 | 11/2007 | Tuscano et al. |
| 2007/0271518 A1 | 11/2007 | Tischer et al. |
| 2007/0271580 A1 | 11/2007 | Tischer et al. |
| 2008/0004958 A1 | 1/2008 | Ralph et al. |
| 2008/0086356 A1 | 4/2008 | Glassman et al. |
| 2008/0091639 A1 | 4/2008 | Davis et al. |
| 2008/0126420 A1 | 5/2008 | Wright et al. |
| 2008/0201427 A1 | 8/2008 | Chen |
| 2008/0201472 A1 | 8/2008 | Bistriceanu et al. |
| 2008/0222201 A1 | 9/2008 | Chen et al. |
| 2008/0235243 A1 | 9/2008 | Lee et al. |

(56) References Cited

U.S. PATENT DOCUMENTS

| | | |
|---|---|---|
| 2008/0248815 A1 | 10/2008 | Busch |
| 2008/0276179 A1 | 11/2008 | Borenstein et al. |
| 2008/0300965 A1 | 12/2008 | Doe |
| 2009/0030780 A1 | 1/2009 | York et al. |
| 2009/0055241 A1 | 2/2009 | Chen et al. |
| 2009/0070443 A1 | 3/2009 | Vanderhook et al. |
| 2009/0070797 A1 | 3/2009 | Ramaswamy et al. |
| 2009/0076899 A1 | 3/2009 | Gbodimowo |
| 2009/0171762 A1 | 7/2009 | Alkove et al. |
| 2009/0217315 A1 | 8/2009 | Malik et al. |
| 2009/0292587 A1 | 11/2009 | Fitzgerald |
| 2009/0307084 A1 | 12/2009 | Monighetti et al. |
| 2009/0327026 A1 | 12/2009 | Bistriceanu et al. |
| 2010/0010866 A1 | 1/2010 | Bal et al. |
| 2010/0070621 A1 | 3/2010 | Urdan et al. |
| 2010/0088152 A1 | 4/2010 | Bennett |
| 2010/0088373 A1 | 4/2010 | Pinkham |
| 2010/0121676 A1 | 5/2010 | Jackson |
| 2010/0153175 A1 | 6/2010 | Pearson et al. |
| 2010/0153544 A1 | 6/2010 | Krassner et al. |
| 2010/0161385 A1 | 6/2010 | Karypis et al. |
| 2010/0191723 A1 | 7/2010 | Perez et al. |
| 2010/0205057 A1 | 8/2010 | Hook et al. |
| 2010/0241745 A1 | 9/2010 | Offen et al. |
| 2010/0262498 A1 | 10/2010 | Nolet et al. |
| 2010/0268540 A1 | 10/2010 | Arshi et al. |
| 2010/0268573 A1 | 10/2010 | Jain et al. |
| 2010/0281178 A1 | 11/2010 | Sullivan |
| 2010/0299604 A1 | 11/2010 | Blumenau |
| 2010/0312854 A1 | 12/2010 | Hyman |
| 2010/0313009 A1 | 12/2010 | Combet et al. |
| 2010/0325051 A1 | 12/2010 | Etchegoyen |
| 2011/0016482 A1 | 1/2011 | Tidwell et al. |
| 2011/0041062 A1 | 2/2011 | Singer et al. |
| 2011/0087519 A1 | 4/2011 | Fordyce et al. |
| 2011/0093327 A1 | 4/2011 | Fordyce et al. |
| 2011/0106620 A1 | 5/2011 | Setiawan et al. |
| 2011/0131596 A1 | 6/2011 | Amsterdam et al. |
| 2011/0137733 A1 | 6/2011 | Baird et al. |
| 2011/0153391 A1 | 6/2011 | Tenbrock |
| 2011/0157475 A1 | 6/2011 | Wright et al. |
| 2011/0191184 A1 | 8/2011 | Blackhurst et al. |
| 2011/0191664 A1 | 8/2011 | Sheleheda et al. |
| 2011/0191831 A1 | 8/2011 | Chan et al. |
| 2011/0196735 A1 | 8/2011 | von Sydow et al. |
| 2011/0202500 A1 | 8/2011 | Warn et al. |
| 2011/0208860 A1 | 8/2011 | Sim et al. |
| 2011/0231240 A1 | 9/2011 | Schoen et al. |
| 2011/0246297 A1 | 10/2011 | Buchalter et al. |
| 2011/0246306 A1 | 10/2011 | Blackhurst et al. |
| 2011/0246641 A1 | 10/2011 | Pugh et al. |
| 2011/0282730 A1 | 11/2011 | Tarmas |
| 2011/0288907 A1 | 11/2011 | Harvey et al. |
| 2012/0005213 A1 | 1/2012 | Hannan et al. |
| 2012/0030037 A1 | 2/2012 | Carriero |
| 2012/0042005 A1 | 2/2012 | Papakostas et al. |
| 2012/0042338 A1* | 2/2012 | Kitts ............... H04N 21/25866 725/35 |
| 2012/0042339 A1* | 2/2012 | Kitts ............... H04N 21/25866 725/35 |
| 2012/0047013 A1* | 2/2012 | Bigby ................ G06Q 30/02 705/14.52 |
| 2012/0072469 A1 | 3/2012 | Perez et al. |
| 2012/0109709 A1 | 5/2012 | Fordyce et al. |
| 2012/0109882 A1 | 5/2012 | Bouse et al. |
| 2012/0110027 A1 | 5/2012 | Falcon |
| 2012/0110071 A1 | 5/2012 | Zhou et al. |
| 2012/0143713 A1 | 6/2012 | Dittus et al. |
| 2012/0151079 A1 | 6/2012 | Besehanic et al. |
| 2012/0151322 A1 | 6/2012 | Lindsay et al. |
| 2012/0158490 A1 | 6/2012 | Naumeyer et al. |
| 2012/0158954 A1 | 6/2012 | Heffernan et al. |
| 2012/0166520 A1 | 6/2012 | Lindsay et al. |
| 2012/0173701 A1 | 7/2012 | Tenbrock |
| 2012/0185274 A1 | 7/2012 | Hu |
| 2012/0192214 A1 | 7/2012 | Hunn et al. |
| 2012/0206331 A1 | 8/2012 | Gandhi |
| 2012/0209920 A1 | 8/2012 | Neystadt et al. |
| 2012/0215621 A1 | 8/2012 | Heffernan et al. |
| 2012/0239407 A1 | 9/2012 | Lynch et al. |
| 2012/0239809 A1* | 9/2012 | Mazumdar ............ H04L 43/04 709/224 |
| 2012/0265606 A1 | 10/2012 | Patnode |
| 2012/0302222 A1 | 11/2012 | Williamson et al. |
| 2012/0310729 A1 | 12/2012 | Dalto et al. |
| 2012/0311017 A1 | 12/2012 | Sze et al. |
| 2013/0007794 A1 | 1/2013 | Besehanic et al. |
| 2013/0013308 A1 | 1/2013 | Cao et al. |
| 2013/0014144 A1* | 1/2013 | Bhatia ............... H04N 21/252 725/13 |
| 2013/0014146 A1* | 1/2013 | Bhatia ............... H04N 21/252 725/14 |
| 2013/0019262 A1 | 1/2013 | Bhatia et al. |
| 2013/0046615 A1 | 2/2013 | Liyanage |
| 2013/0054628 A1* | 2/2013 | Meierhoefer ......... G06F 17/30 707/758 |
| 2013/0060629 A1 | 3/2013 | Rangsikitpho et al. |
| 2013/0066713 A1 | 3/2013 | Umeda |
| 2013/0080263 A1 | 3/2013 | Goldman et al. |
| 2013/0097311 A1* | 4/2013 | Mazumdar ............ H04L 43/04 709/224 |
| 2013/0097312 A1* | 4/2013 | Mazumdar ............ H04L 43/04 709/224 |
| 2013/0117103 A1 | 5/2013 | Shimizu et al. |
| 2013/0124628 A1 | 5/2013 | Weerasinghe |
| 2013/0138506 A1 | 5/2013 | Zhu et al. |
| 2013/0138743 A1 | 5/2013 | Amento et al. |
| 2013/0145022 A1 | 6/2013 | Srivastava et al. |
| 2013/0159499 A1 | 6/2013 | Besehanic |
| 2013/0198125 A1* | 8/2013 | Oliver ............... G06Q 30/0246 706/46 |
| 2013/0204694 A1 | 8/2013 | Banister et al. |
| 2013/0212188 A1 | 8/2013 | Duterque et al. |
| 2013/0246389 A1 | 9/2013 | Osann, Jr. |
| 2013/0246609 A1 | 9/2013 | Topchy et al. |
| 2013/0262181 A1 | 10/2013 | Topchy et al. |
| 2013/0282898 A1 | 10/2013 | Kalus et al. |
| 2013/0290070 A1 | 10/2013 | Abraham |
| 2013/0297411 A1 | 11/2013 | van Datta et al. |
| 2013/0325588 A1 | 12/2013 | Kalyanam et al. |
| 2013/0331971 A1 | 12/2013 | Bida et al. |
| 2013/0332604 A1 | 12/2013 | Seth et al. |
| 2014/0033317 A1 | 1/2014 | Barber |
| 2014/0046777 A1* | 2/2014 | Markey ............. G06Q 30/0269 705/14.66 |
| 2014/0075004 A1 | 3/2014 | Van Dusen et al. |
| 2014/0075018 A1* | 3/2014 | Maycotte ............ H04L 67/22 709/224 |
| 2014/0108130 A1* | 4/2014 | Vos ................. G06Q 30/0246 705/14.45 |
| 2014/0122703 A1 | 5/2014 | Pugh et al. |
| 2014/0156761 A1 | 6/2014 | Heffernan et al. |
| 2014/0278980 A1* | 9/2014 | Dittus .............. H04N 21/2668 705/14.53 |
| 2014/0279074 A1 | 9/2014 | Chen et al. |
| 2014/0289765 A1* | 9/2014 | Kitts ............... H04N 21/25866 725/35 |
| 2014/0298025 A1 | 10/2014 | Burbank et al. |
| 2014/0304061 A1* | 10/2014 | Bruich .............. G06Q 30/0242 705/14.41 |
| 2014/0324544 A1 | 10/2014 | Donato et al. |
| 2014/0324545 A1* | 10/2014 | Splaine ............. G06Q 30/0277 705/7.33 |
| 2014/0337104 A1 | 11/2014 | Splaine et al. |
| 2015/0019322 A1* | 1/2015 | Alla ................ G06Q 30/0242 705/14.41 |
| 2015/0019327 A1 | 1/2015 | Mazumdar et al. |
| 2015/0046579 A1 | 2/2015 | Perez et al. |
| 2015/0095138 A1* | 4/2015 | Rao ................. H04N 21/44222 705/14.41 |
| 2015/0193816 A1 | 6/2015 | Toupet et al. |
| 2015/0186403 A1 | 7/2015 | Srivastava et al. |

(56) References Cited

U.S. PATENT DOCUMENTS

| | | | | |
|---|---|---|---|---|
| 2015/0189500 | A1* | 7/2015 | Bosworth | H04L 63/062 709/201 |
| 2015/0262201 | A1* | 9/2015 | Rao | G06Q 30/0201 705/7.29 |
| 2015/0262207 | A1* | 9/2015 | Rao | G06Q 30/0203 705/7.32 |
| 2016/0019580 | A1* | 1/2016 | Rao | G06Q 30/0242 705/14.41 |
| 2016/0063539 | A1* | 3/2016 | Alla | G06Q 30/0246 705/14.45 |
| 2016/0232563 | A1* | 8/2016 | Perez | H04L 67/306 |

FOREIGN PATENT DOCUMENTS

| | | |
|---|---|---|
| CN | 101077014 | 11/2007 |
| CN | 101222348 | 7/2008 |
| CN | 101505247 | 8/2009 |
| CN | 101536503 | 9/2009 |
| CN | 104520839 | 4/2015 |
| CN | 104541513 | 4/2015 |
| CN | 104584564 | 4/2015 |
| EP | 1379044 | 1/2004 |
| GB | 2176639 | 12/1986 |
| JP | H07262167 | 10/1995 |
| JP | 2001282982 | 10/2001 |
| JP | 2001357192 | 12/2001 |
| JP | 2002163562 | 6/2002 |
| JP | 2002373152 | 12/2002 |
| JP | 2004504674 | 2/2004 |
| JP | 2006127320 | 5/2006 |
| JP | 2006127321 | 5/2006 |
| JP | 2008234641 | 10/2008 |
| JP | 2010039845 | 2/2010 |
| JP | 2010257448 | 11/2010 |
| KR | 20020037980 | 5/2002 |
| KR | 20120091411 | 8/2002 |
| KR | 20090020558 | 2/2009 |
| KR | 20100094021 | 8/2010 |
| KR | 20110017895 | 2/2011 |
| KR | 20110023293 | 3/2011 |
| KR | 20120123148 | 11/2012 |
| WO | 9617467 | 6/1996 |
| WO | 9628904 | 9/1996 |
| WO | 9641495 | 12/1996 |
| WO | 9809447 | 3/1998 |
| WO | 2000041115 | 7/2000 |
| WO | 0154034 | 7/2001 |
| WO | WO0152168 | 7/2001 |
| WO | 200207054 | 1/2002 |
| WO | 2003027860 | 4/2003 |
| WO | 2005013072 | 2/2005 |
| WO | 2005024689 | 3/2005 |
| WO | 2008150575 | 12/2008 |
| WO | 2010088372 | 8/2010 |
| WO | 2010104285 | 9/2010 |
| WO | 2011/097624 | 8/2011 |
| WO | 2012019643 | 2/2012 |
| WO | 2012/040371 | 3/2012 |
| WO | 2012/087954 | 6/2012 |
| WO | 2012/128895 | 9/2012 |
| WO | 2012170902 | 12/2012 |
| WO | 2012177866 | 12/2012 |
| WO | 2013122907 | 8/2013 |
| WO | 2013188429 | 12/2013 |
| WO | 2014059319 | 4/2014 |
| WO | 2014176343 | 10/2014 |
| WO | 2014179218 | 11/2014 |
| WO | 2014182764 | 11/2014 |
| WO | 2015005957 | 1/2015 |
| WO | 2015023589 | 2/2015 |
| WO | 2015102796 | 7/2015 |
| WO | 2015102803 | 7/2015 |

OTHER PUBLICATIONS

Analysis of Smartphone User Behavior, Dr. Hannu Verkasalo, 2010 Ninth International Conference on Mobile Business / 2010 Ninth Global Mobility Roundtable, IEEE Computer Society.*

Internet and mobile ratings panels, Napoli et al., Online Panel Research: A Data Quality Perspective, First Edition. Edited by Mario Callegaro, Reg Baker, Jelke Bethlehem, Anja S. Göritz, Jon A. Krosnick and Paul J. Lavrakas. © 2014 John Wiley & Sons, Ltd. Published 2014 by John Wiley & Sons, Ltd.*

Japanese Patent Office, "Notice of Reasons for Rejection," issued in connection with Japanese Patent Application No. P2015-0524512 dated Jun. 30, 2015 (6 pages).

State Intellectual Property Office of China, "Second Office Action," issued in connection with Chinese Patent Application No. 201180045957.2, dated Jul. 29, 2015 (5 pages).

Australian Government, IP Australia, "Patent Examination Report No. 1," issued in connection with Australian Application No. 2013204953, dated Dec. 23, 2014 (5 pages).

United States Patent and Trademark Office, "Notice of Allowance," issued in connection with U.S. Appl. No. 14/641,982, dated Sep. 2, 2015 (13 pages).

United States Patent and Trademark Office, "Final Office Action," issued in connection with U.S. Appl. No. 13/963,737, dated Sep. 21, 2015, 14 pages.

International Searching Authority, "International Search Report," issued in connection with International Patent Application No. PCT/US2015/040943, dated Oct. 28, 2015 (3 pages).

International Searching Authority, "Written Opinion," issued in connection with International Patent Application No. PCT/US2015/040943, dated Oct. 28, 2015 (7 pages).

IP Australia, "Patent Examination Report No. 1" issued in connection with Australian Patent Application No. 2015200121 dated Nov. 3, 2015 (2 pages).

United States Patent and Trademark Office, "Non-Final Office Action," issued in connection with U.S. Appl. No. 14/025,567, dated Dec. 11, 2015 (39 pages).

The State Intellectual Property Office of China, "Second Notification of Office Action," issued in connection with Chinese Patent Application No. 201280003504.8, dated Nov. 30, 2015 (9 pages).

IP Australia, "Notice of Grant," issued in connection with Australian Patent Application No. 2011374955, dated Dec. 17, 2015 (1 page).

The State Intellectual Property Office of China, "First Office Action," issued in connection with Chinese Patent Application No. 201310338209.4 dated Dec. 22, 2015 (16 pages).

Canadian Intellectual Property Office, "Office Action," issued in connection with Canadian Patent Application No. 2,875,434, dated Dec. 4, 2015, (4 pages).

Canadian Intellectual Property Office, "Office Action," issued in connection with Canadian Patent Application No. 2,875,437, dated Dec. 4, 2015, (5 pages).

IP Australia, "Notice of Acceptance" issued in connection with Australian Patent Application No. 2014262739, dated Oct. 30, 2015 (2 pages).

European Patent Office, "Extended European Search Report," issued in connection with European Patent Application No. 13803850.0, dated Dec. 9, 2015 (8 pages).

Japanese Patent Office, "Notice of Reasons for Rejection," issued in connection with Japanese Patent Application No. P2015-516283, dated Jan. 19, 2016 (8 pages).

Canadian Intellectual Property Office, "Office Action," issued in connection with Canadian Patent Application No. 2,875,210, dated Jan. 15, 2016 (4 pages).

International Bureau, "International Preliminary Report on Patentability", issued in connection with PCT patent Application No. PCT/US2015/040943, dated Jan. 26, 2017, 9 pages.

United States Patent and Trademark Office, "Non-Final Office Action," issued in connection with U.S. Appl. No. 14/463,309, dated Aug. 5, 2015, 62 pages.

United States Patent and Trademark Office, "Non-Final Office Action," issued in connection with U.S. Appl. No. 14/025,567, dated Aug. 6, 2015, 59 pages.

(56) References Cited

OTHER PUBLICATIONS

Japanese Patent Office, "Notice of Reasons for Rejection," issued in connection with Japanese Patent Application No. P2015-078539 dated Jul. 14, 2015 (6 pages).
IP Australia, "Patent Examination Report No. 1," issued in connection with Australian Patent Application No. 2013204354, dated Nov. 14, 2014 3 pages.
United States Patent and Trademark Office, "Final Office Action," issued in connection with U.S. Appl. No. 14/025,575, dated Aug. 17, 2015, 78 pages.
Braverman, Samantha, "Are the Online Marketing Efforts of TV Shows and Programs Worthwhile?" Mar. 30, 2011 (5 pages).
Danaher, Peter J., Journal of Marketing Research, vol. XXVIII, "A Canonical Expansion Model for Multivariate Media Exposure Distributions: A Generalization of the 'Duplication of Viewing Law,'" Aug. 1991 (7 pages).
Enoch, Glenn. and Johnson, Kelly. Journal of Advertising Research, "Cracking the Cross-Media Code: How to Use Single-Source Measures to Examine Media Cannibalization and Convergence," Jun. 2010 (13 pages).
Headen, Robert S., Klompmaker, Jay E. and Rust, Roland T., Journal and Marketing Research, vol. XVI, "The Duplication of Viewing Law and Television Media Schedule Evaluation," Aug. 1979 (9 pages).
Huang, Chun-Yao and Lin Chen-Shun, Journal of Advertising Research, vol. 35, No. 2, "Modeling the Audience's Banner Ad Exposure for Internet Advertising Planning," Summer 2006 (15 pages).
Nielsen, "How Teens Use Media: A Nielsen Report on the Myths and Realities of Teem Media Trends," Jun. 2009 (17 pages).
Arbitron Inc., Edison Research, "The Infinite Dial 2011: Navigating Digital Platforms," 2011 (83 pages).
Rust, Roland T., Klompmaker, Jay E., Journal for Advertising, vol. 10, No. 3, "A Comparative Study of Television Duplication Models," 1981 (6 pages).
Edwards, Jim. "Apple Wants More Advertisers to Use Its iPhone Tracking System." Business Insider. Jun. 13, 2013. Retrieved from <http://www.businessinsider.com/apples-idfa-and-ifa-tracking-system-2013-6>on Jul. 24, 2014. 2 pages.
Patent Cooperation Treaty, "International Search Report and Written Opinion of the International Searching Authority," issued in connection with Application No. PCT/US2014/031342, dated Jul. 28, 2014, 13 pages.
Facebook for Business. "Measuring Conversions on Facebook, Across Devices and in Mobile Apps" Aug. 14, 2014. Retrieved from <https://www.facebook.com/business/news/cross-device-measurement> on Aug. 14, 2014. 3 pages.
Japanese Patent Office, "Office Action" with English translation, issued in connection with application No. JP 2013-544887, dated Aug. 12, 2014, 21 pages.
Patent Cooperation Treaty, "International Search Report," issued in connection with Application No. PCT/US2014/035156, dated Aug. 25, 2014, 5 pages.
Patent Cooperation Treaty, "Written Opinion," issued in connection with Application No. PCT/US2014/035156, dated Aug. 25, 2014, 5 pages.
Patent Cooperation Treaty, "International Search Report and Written Opinion of the International Searching Authority," issued in connection with Application No. PCT/US2014/034389, dated Sep. 5, 2014, 15 pages.
European Patent Office, "Extended European Search Report," issued in connection with application No. EP 12760524.4 dated Aug. 18, 2014, 8 pages.
Patent Cooperation Treaty, "International Search Report and Written Opinion," issued in connection with Application No. PCT/US2014/035683, dated Sep. 12, 2014, 13 pages.
Patent Cooperation Treaty, "International Search Report and Written Opinion," issued in connection with Application No. PCT/US2014/037064, dated Sep. 12, 2014, 9 pages.
Adam et al., "Privacy Preserving Integration of Health Care Data," AMIA 2007 Symposium Proceedings, 6 pages.
Australian Government, IP Australia, "Examination Report," issued in connection with application No. AU 2013205736, dated Jun. 18, 2013, 2 pages.
Chloe Albanesius, Facebook Issues Fix for Several Tracking Cookies, internet article, www.pcmag.com, Sep. 28, 2011, 2 pages.
Emil Protalinski, Facebook denies cookie tracking allegations, internet article, www.zdnet.com, Sep. 25, 2011, 2 pages.
Emil Protalinski, Facebook fixes cookie behavior after logging out, internet article, www.zdnet.com, Sep. 27, 2011, 2 pages.
Emil Protalinski, US congressmen ask FTC to investigate Facebook cookies, internet article, www.zdnet.com, Sep. 28, 2011, 2 pages.
Fliptop, "Fliptop Person API Documentation," https://developer.fliptop.com/documentation, retrieved on May 7, 2013(6 pages).
Fliptop, "Get, Keep and Grow Customers with Fliptop's Customer Intelligence Application," www.fliptop.com/features#social_matching, retrieved on May 7, 2013 (3 pages).
Fliptop, "What is Fliptop?", www.fliptop.com/about_us, retrieved on May 7, 2013 (1 page).
International Bureau, "International Preliminary Report on Patentability," issued in connection with PCT application Serial No. PCT/US2011/052623, dated Mar. 26, 2013 (5 pages).
International Searching Authority, "International Preliminary Report on Patentability," issued in connection with application No. PCT/US2012/026760, dated Sep. 24, 2013 (4 pages).
International Searching Authority, "International Search Report," issued in connection with application No. PCT/US2011/052623, dated Mar. 8, 2012 (3 pages).
International Searching Authority, "International Search Report," issued in connection with application No. PCT/US2012/026760, dated Jan. 2, 2013 (3 pages).
International Searching Authority, "International Search Report," issued in connection with International Application No. PCT/US2013/025687 dated Jun. 2, 2013, 5 pages.
International Searching Authority, "Written Opinion of the International Searching Authority," issued in issued in connection with International Application No. PCT/US2013/025687 dated Jun. 2, 2013, 5 pages.
International Searching Authority, "Written Opinion," issued in connection with application No. PCT/US2011/052623, dated Mar. 8, 2012 (4 pages).
International Searching Authority, "Written Opinion," issued in connection with application No. PCT/US2011/065881, dated Jul. 9, 2012 (6 pages).
International Searching Authority, "Written Opinion," issued in connection with application No. PCT/US2012/026760, dated Jan. 2, 2013 (3 pages).
JavaScript and AJAX Forum, Sep. 28, 2005, [retrieved from Internet at http://www.webmasterworld.com/ forum91/4465.htm on Jun. 29, 2011] 4 pages.
Launder, "Media Journal: Nielsen to Test Online-TV Viewing Tool," The Wall Street Journal, Apr. 30, 2013, 2 pages.
Mental Poker, Wikipedia, Jan. 12, 2010, [retrieved from Internet at p://en.wikipedia.org/wiki/Mental_poker on Sep. 21, 2010] 5 pages.
Nielsen Unveils New Online Advertising Measurement, The Nielsen Company, Sep. 27, 2010, [retrieved from Internet at http://nielsen.com/us/en/insights/press-room/2010/nielsen_unveils_newonlineadvertisingmeasurement.html on May 31, 2012] 3 pages.
Nik Cubrilovic, Logging out of Facebook is not enough, internet article, www.nikcub.appspot.com, Sep. 25, 2011, 3 pages.
Patent Cooperation Treaty, "International Search Report," issued by the International Searching Authority in connection with PCT application No. PCT/US2011/065881, dated Jul. 9, 2012 (3 pages).
Rapleaf, "Fast. Simple. Secure," www.rapleaf.com/why-rapleaf/, retrieved on May 7, 2013 (3 pages).
Rapleaf, "Frequently Asked Questions," www.rapleaf.com/about-us/faq/#where, retrieved on May 7, 2013 (3 pages).
Rapleaf, "The Consumer Data Marketplace," www.rapleaf.com/under-the-hood/, retrieved on May 7, 2013 (2 pages).
Sharma, "Nielsen Gets Digital to Track Online TV Viewers," All Things, Apr. 30, 2013, 1 page.

(56) References Cited

OTHER PUBLICATIONS

Steve Coffey, "Internet Audience Measurement: A Practitioner's View," Journal of Interactive Advertising, vol. 1, No. 2, Spring 2001, pp. 10-17.
United States Patent and Trademark Office, "Final Office Action," issued in connection with U.S. Appl. No. 13/690,915, dated Dec. 20, 2013, 6 pages.
United States Patent and Trademark Office, "Non-Final Office Action," issued in connection with U.S. Appl. No. 13/239,005, dated Jun. 4, 2013 (28 pages).
United States Patent and Trademark Office, "Non-Final Office Action," issued in connection with U.S. Appl. No. 13/690,915, dated Sep. 5, 2013 (36 pages).
United States Patent and Trademark Office, "Non-Final Office Action," issued in connection with U.S. Appl. No. 13/691,175, dated Sep. 9, 2013 (35 pages).
United States Patent and Trademark Office, "Notice of Allowance," issued in connection with U.S. Appl. No. 13/239,005, dated Nov. 27, 2013, 46 pages.
United States Patent and Trademark Office, "Notice of Allowance," issued in connection with U.S. Appl. No. 13/513,148, dated Nov. 5, 2012 (27 pages).
United States Patent and Trademark Office, "Notice of Allowance," issued in connection with U.S. Appl. No. 13/691,175, dated Jan. 27, 2014, 15 pages.
United States Patent and Trademark Office, "Notice of Allowance," issued in connection with U.S. Appl. No. 13/691,175, dated May 9, 2014, 6 pages.
Vega, Tanzina, "Nielsen Introduces New Ad Measurement Product," The New York Times, Sep. 27, 2010 (7 pages).
Vranica, "Nielsen Testing a New Web-Ad Metric," The Wall Street Journal, Sep. 23, 2010,2 pages.
United States Patent and Trademark Office, "Non-Final Office Action," issued in connection with U.S. Appl. No. 13/756,493, dated Jan. 17, 2014, 32 pages.
United States Patent and Trademark Office, "Notice of Allowance and Fee(s) Due," issued in connection with U.S. Appl. No. 13/690,915, dated Apr. 9, 2014, 28 pages.
Japan Patent Office, "Notice of Reasons for Rejection," issued in connection with Application No. 2013-529435, dated Aug. 20, 2013, 4 pages.
Patent Cooperation Treaty, "International Search Report and Written Opinion of the International Searching Authority," issued by the International Searching Authority in connection with PCT/US2013/045211, dated Feb. 25, 2014 (13 pages).
United States Patent and Trademark Office, "Non-Final Office Action," issued in connection with U.S. Appl. No. 13/396,071, dated May 9, 2014, 35 pages.
United States Patent and Trademark Office, "Non-Final Office Action," issued in connection with U.S. Appl. No. 13/209,292, dated Apr. 8, 2014, 15 pages.
Patent Cooperation Treaty, "International Search Report," issued by the International Searching Authority in connection with PCT/US2011/052762, dated Aug. 22, 2012 (4 pages).
International Searching Authority, "Written Opinion," issued in connection with application No. PCT/US2011/0052762, dated Aug. 22, 2012 (4 pages).
Patent Cooperation Treaty, "International Search Report," issued by the International Searching Authority in connection with PCT/US2013/057045, dated Dec. 27, 2013 (3 pages).
International Searching Authority, "Written Opinion," issued in connection with application No. PCT/US2013/057045, dated Dec. 27, 2013 (5 pages).
United States Patent and Trademark Office, "Notice of Allowance," issued in connection with U.S. Appl. No. 13/756,493, dated May 20, 2014, 32 pages.
Hothorn et al. "Unbiased Recursive Partitioning: A Conditional Inference Framework," Journal of Computational and Geographical Statistics, vol. 15, No. 3, 2006, pp. 651-674 (21 pages).
United States Patent and Trademark Office, "Notice of Allowance," issued in connection with U.S. Appl. No. 13/396,071, dated Oct. 24, 2014, 31 pages.
Canadian Intellectual Property Office, "Office Action," issued in connection with Canadian Patent Application No. 2,819,268, dated Nov. 24, 2014 (4 pages).
United States Patent and Trademark Office, "Office Action," issued in connection with U.S. Appl. No. 14/014,050, dated Sep. 12, 2014, 32 pages.
Patent Cooperation Treaty, "International Search Report and Written Opinion," issued in connection with Application No. PCT/US2014/050551, dated Nov. 24, 2014, 11 pages.
Patent Cooperation Treaty, "International Preliminary Report on Patentability," issued in connection with Application No. PCT/US2013/045211, dated Dec. 16, 2014, 8 pages.
IP Australia, "Patent Examination Report No. 1," issued in connection with Application No. 2013204865, dated Dec. 22, 2014, 3 pages.
United States Patent and Trademark Office, "Non-Final Office Action," issued in connection with U.S. Appl. No. 13/915,381, dated Jan. 30, 2015, 51 pages.
Patent Cooperation Treaty, "International Search Report," issued in connection with Application No. PCT/US2014/068621, dated Feb. 27, 2015, 3 pages.
Patent Cooperation Treaty, "Written Opinion," issued in connection with Application No. PCT/US2014/068621, dated Feb. 27, 2015, 7 pages.
Canadian Intellectual Property Office, "Examination Search Report," issued in connection with Application No. 2,810,541 dated Jan. 20, 2015, 3 pages.
The State Intellectual Property Office of China, "First Notification of Office Action," issued in connection with Application No. 201180045957.2, dated Nov. 15, 2014 (20 pages).
Japanese Patent Office, "Final Rejection," issed in connection with Japanese Patent Application No. P2014-005867 dated Aug. 26, 2014, (8 pages).
Japanese Patent Office, "Notice of Reasons for Rejection," issued in connection with Japanese Patent Application No. P2014-005867 dated Feb. 17, 2015, (6 pages).
Japanenese Patent Office, "Notice of Reasons for Rejection," issued in connection with Japanese Patenet Application No. P2014-005867 dated Apr. 15, 2014, (10 pages).
United States Patenet and Trademark Office, "Office Action Summary," issued in connection with U.S. Appl. No. 14/500,297, dated Jan. 5, 2015, (7 pages).
Australian Government, IP Australia, "Patent Examination Report No. 1," issued in connection with Australian Patent Application No. 2013203898, dated Nov. 27, 2014 (4 pages).
Australian Government, IP Australia, "Patent Examination Report No. 1," issued in connection with application No. 2011305429 dated Apr. 17, 2014 (4 pages).
The State Intellectual Property Office of China, "First Notification of Office Action," issued in connection with Application No. 201180061437.0, dated Mar. 7, 2014, (11 pages).
The State Intellectual Property Office of China, "Second Notification of Office Action," issued in connection with Application No. 201180061437.0, dated Nov. 15, 2014, (6 pages).
Australian Government, IP Australia,"Patent Examination Report No. 1," issued in connection with Application No. 2011374955, dated Sep. 25, 2014, (3 pages).
Canadian Intellectual Property Office, "Examination Search Report," issued in connection with Application No. 2,873,128, dated Jan. 7, 2015, (3 pages).
Patent Cooperation Treaty, "International Search Report," issued by the International Searching Authority in connection with PCT Application No. PCT/US2014/068165, dated Feb. 25, 2015, (3 pages).
Patent Cooperation Treaty, "Written Opinion of the International Searching Authority," issued by the International Searching Authority in connection with PCT Application No. PCT/US2014/068165, dated Feb. 25, 2015, (5 pages).

(56) References Cited

OTHER PUBLICATIONS

United States Patent and Trademark Office, "Non-Final Office Action," issued in connection with U.S. Appl. No. 13/756,493, dated Nov. 19, 2014 (13 pages).
Canadian Intellectual Property Office, Office Action, issued in connection with Canadian Patent Application No. 2,810,264, dated Nov. 27, 2014, (5 pages).
IP Australia, "Examination Report No. 2," issued in connection with application No. AU 2012231667, dated Feb. 10, 2015, (3 pages.).
United States Patent and Trademark Office, "Notice of Allowance," issued in connection with U.S. Appl. No. 13/756,493, dated Mar. 17, 2015, 15 pages.
Patent Cooperation Treaty, "International Search Report," issued by the International Searching Authority in connection with PCT application No. PCT/US2014/068168, dated Mar. 2, 2015 (3 pages).
Patent Cooperation Treaty, "Written Opinion of the International Searching Authority," issued by the International Searching Authority in connection with PCT application No. PCT/US2014/068168, dated Mar. 2, 2015 (5 pages).
Patent Cooperation Treaty, "International Preliminary Report on Patentability," issued in connection with Application No. PCT/US2013/057045, dated Mar. 3, 2015 (1 page).
Patent Cooperation Treaty, "International Search Report," issued in connection with Application No. PCT/US2014/068623, dated Mar. 23, 2015 (3 pages).
Patent Cooperation Treaty, "Written Opinion," issued in connection with Application No. PCT/US2014/068623, dated Mar. 23, 2015 (8 pages).
Patent Cooperation Treaty, "International Search Report," issued in connection with Application No. PCT/US2014/068202, dated Apr. 10, 2015, 3 pages.
Patent Cooperation Treaty, "Written Opinion," issued in connection with Application No. PCT/US2014/068202, dated Apr. 10, 2015, 7 pages.
European Patent Office, "Extended European Search Report," issued in connection with application No. EP 14004028.8, dated Apr. 9, 2015, 7 pages.
United States Patent and Trademark Office, "Non-Final Office Action," issued in connection with U.S. Appl. No. 14/025,575, dated Apr. 16, 2015, 72 pages.
The State Intellectual Property Office of China, "First Notification of Office Action," issued in connection with application No. CN 201280003504.8, dated Apr. 1, 2015, with English translation, 17 pages.
IP Australia, "Patent Examination Report No. 1," issued in connection with Application No. 2014260163, dated Apr. 21, 2015, 3 pages.
United States Patent and Trademark Office, "Notice of Allowance," issued in connection with U.S. Appl. No. 14/500,297, dated May 21, 2015, (31 pages).
IP Australia, "Notice of Acceptance" issued in connection with Application No. 2012231667, dated May 15, 2015, 3 pages.
United States Patent and Trademark Office, "Non-Final Office Action," issued in connection with U.S. Appl. No. 14/014,050, dated May 28, 2015, 20 pages.
Japanese Patent Office, "Notice of Allowance" with English translation, issued in connection with application No. JP 2013-544887, dated May 27, 2015, 5 pages.
United States Patent and Trademark Office, "Notice of Allowance," issued in connection with U.S. Appl. No. 13/690,915, dated Jun. 24, 2014 (6 pages).
United States Patent and Trademark Office, "Supplemental Notice of Allowability," issued in connection with U.S. Appl. No. 13/690,915, dated Jul. 8, 2014 (3 pages).
United States Patent and Trademark Office, "Corrected Notice of Allowability," issued in connection with U.S. Appl. No. 13/690,915, dated Nov. 6, 2014 (6 pages).
IP Australia, "Patent Examination Report No. 1," issued in connection with Application No. 2014262739, dated May 29, 2015, 4 pages.
United States Patent and Trademark Office, "Notice of Allowance," issued in connection with U.S. Appl. No. 13/915,381, dated Jun. 8, 2015, 44 pages.
United States Patent and Trademark Office, "Non-Final Office Action," issued in connection with U.S. Appl. No. 13/404,984, dated May 20, 2015, (27 pages).
United States Patent and Trademark Office, "Notice of Allowance," issued in connection with U.S. Appl. No. 13/690,915, dated Jun. 5, 2015, (64 pages).
Japanese Patent Office, "Notice of Allowance," issued in connection with Japanese Patent Application No. 2014-005867 dated Jun. 9, 2015 (3 pages).
IP Australia, "Patent Examination Report No. 1," issued in connection with Application No. 2011349435, dated Nov. 4, 2014 (3 pages).
Japanese Patent Office, "Notice of Allowance," issued in connection with Japanese Patent Application No. 2013-546286 dated Mar. 10, 2015 (6 pages).
Japanese Patent Office, "Office Action," issued in connection with Japanese Patent Application No. 2013543286, dated Aug. 26, 2014 (5 pages).
United States Patent and Trademark Office, "Notice of Allowance," issued in connection with U.S. Appl. No. 13/995,864, dated Oct. 28, 2014 (9 pages).
Goerg et al., "How Many Millenials Visit YouTube? Estimating Unobserved Events From Incomplete Panel Data Conditioned on Demographic Covariates," Apr. 27, 2015, 27 pages, Google Inc.
Goerg et al., "How Many People Visit YouTube? Imputing Missing Events in Panels With Excess Zeros," 2015, 6 pages, Google Inc.
IP Australia, "Notice of Acceptance," issued in connection with Application No. 2013204865, dated Jun. 30, 2015, 2 pages.
United States Patent and Trademark Office, "Non-Final Office Action," issued in connection with U.S. Appl. No. 14/014,044, dated Jul. 2, 2015, 69 pages.

* cited by examiner

METHODS AND APPARATUS TO DETERMINE IMPRESSIONS CORRESPONDING TO MARKET SEGMENTS

RELATED APPLICATIONS

This patent claims priority to U.S. Provisional Patent Application Ser. No. 62/026,001, filed Jul. 17, 2014, and to U.S. Provisional Patent Application Ser. No. 62/117,253, filed Feb. 17, 2015. The entireties of U.S. Provisional Patent Application Ser. No. 62/026,001 and U.S. Provisional Patent Application Ser. No. 62/117,253 are incorporated herein by reference.

FIELD OF THE DISCLOSURE

This disclosure relates generally to audience measurement, and, more particularly, to methods and apparatus to determine impressions corresponding to market segments.

BACKGROUND

Techniques for monitoring user access to Internet resources such as web pages, advertisements and/or other media have evolved significantly over the years. Some prior systems perform such monitoring primarily through server logs. In particular, entities serving media on the Internet can use such prior systems to log the number of requests received for their media at their server. However, such systems lack a means to determine any characteristics about the persons responsible for the logged requests.

BRIEF DESCRIPTION OF THE DRAWINGS

The figures are not to scale. Wherever appropriate, the same reference numbers will be used throughout the drawing(s) and accompanying written description to refer to the same or like parts.

DETAILED DESCRIPTION

Figure 1:
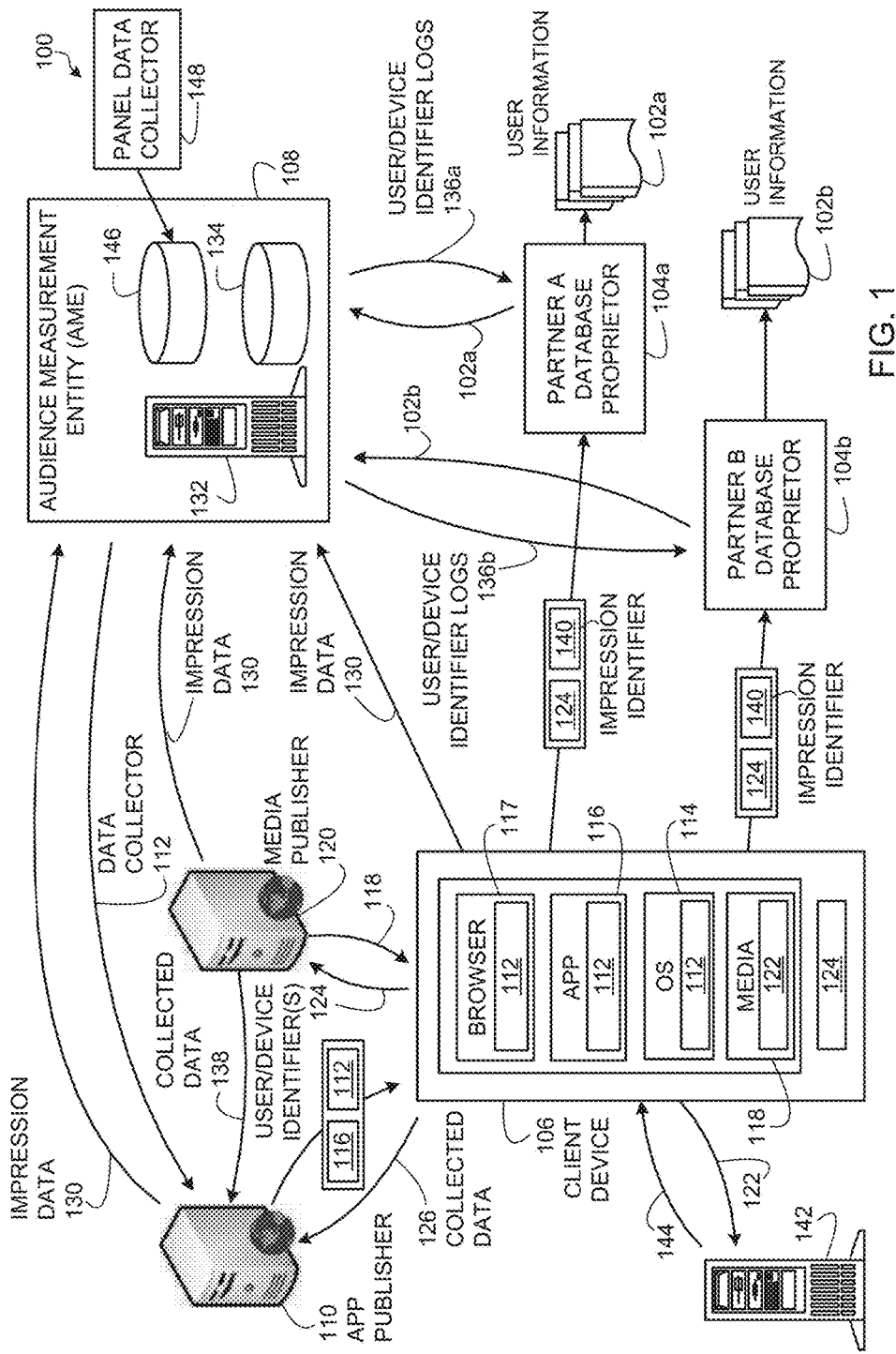
FIG. 1 depicts an example system to collect user information from distributed database proprietors for associating with impressions of media presented at a client device in accordance with the teachings of this disclosure.

Techniques for monitoring user access to Internet resources such as web pages, advertisements and/or other media have evolved significantly over the years. At one point in the past, such monitoring was done primarily through server logs. In particular, entities serving media on the Internet would log the number of requests received for their media at their server. Basing Internet usage research on server logs is problematic for several reasons. For example, server logs can be tampered with either directly or via zombie programs which repeatedly request media from servers to increase the server log counts corresponding to the requested media. Secondly, media is sometimes retrieved once, cached locally and then repeatedly viewed from the local cache without involving the server in the repeat viewings. Server logs cannot track these views of cached media because reproducing locally cached media does not require re-requesting the media from a server. Thus, server logs are susceptible to both over-counting and under-counting errors.

The inventions disclosed in Blumenau, U.S. Pat. No. 6,108,637, fundamentally changed the way Internet monitoring is performed and overcame the limitations of the server side log monitoring techniques described above. For example, Blumenau disclosed a technique wherein Internet media to be tracked is tagged with beacon instructions. In particular, monitoring instructions are associated with the Hypertext Markup Language (HTML) of the media to be tracked. When a client requests the media, both the media and the beacon instructions are downloaded to the client. The beacon instructions are, thus, executed whenever the media is accessed, be it from a server or from a cache.

The beacon instructions cause monitoring data reflecting information about the access to the media to be sent from the client that downloaded the media to a monitoring entity. Typically, the monitoring entity is an audience measurement entity (AME) (e.g., any entity interested in measuring or tracking audience exposures to advertisements, media, and/or any other media) that did not provide the media to the client and who is a trusted third party for providing accurate usage statistics (e.g., The Nielsen Company, LLC). Advantageously, because the beaconing instructions are associated with the media and executed by the client browser whenever the media is accessed, the monitoring information is provided to the AME irrespective of whether the client is a panelist of the AME.

It is useful, however, to link demographics and/or other user information to the monitoring information. To address this issue, the AME establishes a panel of users who have agreed to provide their demographic information and to have their Internet browsing activities monitored. When an individual joins the panel, they provide detailed information concerning their identity and demographics (e.g., gender, race, income, home location, occupation, etc.) to the AME. The AME sets a cookie (or other persistent identifier) on the panelist computer that enables the AME to identify the panelist whenever the panelist accesses tagged media and, thus, sends monitoring information to the AME.

Most of the clients providing monitoring information from the tagged pages are not panelists and, thus, are unknown to the AME. Thus, it is necessary to use statistical methods to impute demographic information based on the data collected for panelists to the larger population of users providing data for the tagged media. However, panel sizes of AMEs remain small compared to the general population of users. Thus, a problem is presented as to how to increase panel sizes while ensuring the demographics data of the panel are accurate.

There are many database proprietors operating on the Internet. These database proprietors provide services (e.g., social networking services, email services, media access services, etc.) to large numbers of subscribers. In exchange for the provision of such services, the subscribers register with the database proprietors. As part of this registration, the subscribers provide detailed demographic information. Examples of such database proprietors include social network providers such as Facebook, Myspace, Twitter, etc. These database proprietors set cookies on the computers of their subscribers to enable the database proprietors to recognize registered users when such registered users visit their websites.

Examples disclosed herein can be used to determine media impressions, advertisement impressions, media exposure, and/or advertisement exposure based on user information, which is distributed across different databases (e.g., different website owners, service providers, etc.) on the Internet. Not only do example methods, apparatus, and articles of manufacture disclosed herein enable more accurate correlation of Internet media exposure to user information, but they also effectively extend panel sizes and compositions beyond persons participating in the panel of an audience measurement entity and/or a ratings entity to persons registered in other Internet databases such as the databases of wireless service carriers, mobile software/service providers, social medium sites (e.g., Facebook, Twitter, Google, etc.), and/or any other Internet sites such as Yahoo!, MSN, Apple iTunes, Experian, etc. This extension effectively leverages the media impression tracking capabilities of the AME and the use of databases of non-AME entities such as social media and other websites to create an enormous, demographically accurate panel that results in accurate, reliable measurements of exposures to Internet media such as advertising and/or programming Examples of such media include web sites, images presented on web sites, and/or streaming media accessible via a computing device (e.g., Amazon Video, Netflix, Hulu, etc.).

Traditionally, AMEs (also referred to herein as "ratings entities") determine demographic reach for advertising and media programming based on registered panel members. That is, an AME enrolls people who consent to being monitored into a panel. During enrollment, the AME receives demographic information from the enrolling people so that subsequent correlations may be made between advertisement/media exposure to those panelists and different demographic markets. Unlike traditional techniques in which AMEs rely solely on their own panel member data to collect demographics-based audience measurements, example methods, apparatus, and/or articles of manufacture disclosed herein enable an AME to obtain demographic information shared by other entities (e.g., database proprietors) that operate based on user registration models to collect such demographic information. In some examples, the AME also shares its panel member demographic information with such other entities (e.g., database proprietors). Such entities may be referred to as "database proprietors" and include entities such as wireless service carriers, mobile software/service providers, social medium sites (e.g., Facebook, Twitter, Google, etc.), and/or any other Internet sites such as Yahoo!, MSN, Apple iTunes, Experian, etc. that collect demographic data of users which may be in exchange for a service.

As used herein, a user registration model is a model in which users subscribe to services of database proprietors by creating an account and providing demographic-related information about themselves. Receiving demographic information associated with registered users of database proprietors at an AME enables the AME to extend or supplement their panel data with substantially reliable demographics information from external sources (e.g., database proprietors), thus extending the coverage, accuracy, and/or completeness of their demographics-based audience measurements. Such access also enables the AME to measure persons who would not otherwise have joined an AME panel. Any entity having a database identifying demographics of a set of individuals may cooperate with the AME.

Examples disclosed herein may be implemented by an AME (e.g., any entity interested in measuring or tracking audience exposures to advertisements, content, and/or any other media) in cooperation with any number of database proprietors, such as online web services providers, to develop online media exposure metrics. Such database proprietors/online web services providers may be wireless service carriers, mobile software/service providers, social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian) and/or any other web service(s) site that maintains user registration records.

The use of demographic information from disparate data sources, such as database proprietors, (e.g., high-quality demographic information from the panels of an audience measurement entity and/or registered user data of web service providers) results in improved reporting effectiveness of metrics for both online and offline advertising campaigns. Example techniques disclosed herein use online registration data to identify demographics of users, and/or other user information, and use server impression counts, and/or other techniques to track quantities of impressions attributable to those users. Online web service providers such as wireless service carriers, mobile software/service providers, social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting services (e.g., Experian), etc. (collectively and individually referred to herein as online database proprietors) maintain detailed demographic information (e.g., age, gender, geographic location, race, income level, education level, religion, etc.) collected via user registration processes.

An impression corresponds to a home or individual having been exposed to the corresponding media and/or advertisement. Thus, an impression represents a home or an individual having been exposed to an advertisement or media or group of advertisements or media. In Internet advertising, a quantity of impressions, also referred to as impression counts, is the total number of times an advertisement or advertisement campaign has been accessed by a web population (e.g., including the number of times accessed as decreased by, for example, pop-up blockers and/or increased by, for example, retrieval from local cache memory). An amount of time for which there was exposure may also be measured. As used herein, the term "duration unit" is defined to be an impression that corresponds to a period of time, such as 10 seconds, 30 seconds, a minute, or any other unit. For example, if two minutes of a video are viewed and a duration unit corresponds to one minute, two duration units are credited to the video due to the viewing.

Impression data is collected from mobile devices that extend beyond mobile device panels (e.g., impression data is collected from every user of a particular application on the mobile device, whether or not the user of the mobile device is a member of a panel of mobile device users). While the database proprietors that provide demographic information corresponding to the impressions enable the impressions to be attributed to certain defined demographic groups (e.g., age/gender groups), the database proprietors may not be able to provide information about other demographic factor and/or market segments of interest (e.g., household income, ethnicity, etc.). In such circumstances, impression information cannot be determined or reported for these demographic factors and/or market segments using the database proprietor information.

Furthermore, mobile device audience measurement panels may not have demographic or market segment characteristics that are comparable to the actual audience of an item of media that corresponds to the impressions. As a result, market segment information derived from such mobile device audience measurement panels may be biased, even significantly biased, thereby introducing bias error into the resulting market segment share estimate. Panels of mobile device users may be incomplete because, among other reasons, panelist metering software (used to monitor panelist activity on the mobile devices) may not be installed and/or may not be installable on some types of mobile devices. The absence of metering software may occur because, for example, such metering software is not granted sufficient permissions to provide useful data and/or such metering software requires excess computing resources (e.g., computing resources that negatively affect the exposure of the user using the computing device (e.g., prospective panelists) to a degree in excess of a level that is considered tolerable). For this reason, current mobile device panels may likewise suffer from significant bias error when applied to media impressions for the purposes of analyzing market segment share.

Examples disclosed herein use a hierarchical approach to estimate a panel audience for the panel-based market segment share. As explained in more detail below, the panel-based market segment share estimate may be dependent on a panel sample size being at least a threshold size (e.g., the panel including at least a threshold number of people). A panel is a set of audience members recruited by an audience measurement entity for audience measurement purposes. Panelists provide detailed demographic information to the audience measurement entity and agree to permit the audience measurement entity to monitor their media exposure habits. The panel is created and maintained by the audience measurement entity for measuring audience behavior as a representative sample of an audience of interest (e.g., a portion of the panel audience meeting certain demographic criteria). In some examples, the audience measurement panel (e.g., a television audience panel, a cross-platform audience panel, a radio audience panel, etc.) used to determine the panel-based market segment share mentioned above is selected based on a number of persons of an audience panel in a demographic group and availability of data representative of the media corresponding to the media impressions.

In some disclosed examples, media impression information is collected by an audience measurement entity in cooperation with one or more database proprietors. The example audience measurement entity (or another party) attributes (or allocates) collected impressions to the appropriate demographic groups. This attribution process includes correcting for data collection errors and/or biases. Example methods and apparatus to collect impression data and to attribute demographic information to the impression data are disclosed in U.S. patent application Ser. No. 14/560,947, filed Dec. 4, 2014. The entirety of U.S. patent application Ser. No. 14/560,947 is incorporated herein by reference.

In addition to the demographic makeup of a set of impressions that can be provided by the database proprietor, advertisers may also be interested in one or more specific market segments not available from (and/or not fully represented by the data of) the database proprietor. Such market segments may represent specific portions of the audience that have one or more common characteristics (e.g., race, gender, native language, income, political affiliation, etc.) and who, as a group, are more likely (or less likely) to respond to a stimulus with a particular behavior than the audience as a whole.

As used herein, the term "market segment" refers to a group of people who have or are estimated to have one or more common characteristics. As used herein, the terms "demographics," "demographic data," "demographic characteristics," and/or "demographic information" refer to characteristics that describe a particular person or group of people. Example demographic information includes age, gender, race, income, native language, home location, and/or occupation. In some examples, a market segment of interest is specified using, among other things, one or more demographic characteristics. As used herein, a share of media impressions for a market segment of interest (also referred to as a market segment share) refers to a subset or portion of a larger collection of impressions corresponding to a particular market segment of interest and logged in connection with numerous other market segments.

As an example, in the television ratings context, market segments may be determined by consulting a television audience measurement panel, such as the Nielsen National TV Ratings Panel, that is statistically selected to be representative of the total audience including many market segments. To determine the market share for a market segment in the television ratings context, an audience measurement entity, such as The Nielsen Company, may determine the portion of the total television audience who are in the market segment of interest. The audience measurement entity then determines the market share for the market segment of interest (e.g., a percentage of the audience that is represented by the market segment) by dividing the determined portion by the total estimated audience size.

Examples disclosed herein determine a share (or portion) of media impressions occurring on mobile devices that are attributable to a market segment of interest. In examples disclosed herein, a share refers to a portion of impressions that is a subset of a larger group of impressions. In some examples, the market segment of interest is not identifiable by a database proprietor from which demographic information corresponding to the media impressions is obtained because, for example, the database proprietor does not or cannot collect market segment information for the market segment of interest. The market segment of interest may be defined by a demographic characteristic that is unknown to the database proprietor. In some disclosed examples, an audience panel for a different media platform (e.g., a television audience panel, a radio audience panel, a PC audience panel, etc.) is used to determine the share of media impressions for the market segment of interest, where the audience panel has information about the market segment of interest (e.g., the audience panel has access to the characteristic defining the market segment, which characteristic is not known by the database proprietor). In some examples, the panel is selected to have an audience whose media access behaviors are as similar as possible to the media access behaviors of the mobile device audience corresponding to the media impressions.

Examples disclosed herein use a hierarchical process to calculate a market segment share at a most detailed (e.g., granular) level possible for which accurate data is available. This determination of the level of detail possible is made by identifying one or more relevant data sets that achieve a specified precision for the estimated market segment share. For example, the AME may divide panelists into demographic groups at multiple levels (e.g., hierarchical levels) that range from more granular to less granular by demographic composition. Example hierarchical levels are shown in Table 1 below, in order from least granular level (e.g., Male) to most granular level (e.g., Male, Age 24-35, Income>100K).

TABLE 1

Example Hierarchical Levels

| Granularity Levels | Number of Panelists |
| --- | --- |
| Male | 100,000 |
| Male, Age 24-35 | 20,000 |
| Male, Age 24-35, Income >100K | 3,000 |

As used herein, the term "precision" refers to the amount of sampling error associated with a given metric. Typically, precision increases as sample size increases, and decreases as sample size decreases. As used herein, the term "sample size" refers to the number of panelists exhibiting the behavior of interest (for example, in the audience). However, references to sample size may be replaced with direct measures of precision such as standard error or variance, in which case requirements of sample size thresholds (e.g., minimum sample size thresholds) would be replaced with standard error or variance thresholds (e.g., a maximum standard error threshold, a maximum variance threshold).

If the sample size associated with the market segment share is smaller than a threshold for a particular demographic group (e.g., females, 21-24 years old), disclosed examples combine multiple demographic groups (e.g., the group females, 21-24, the group females, 18-21, and the group females, 24-30) to calculate the market segment share for a larger, combined demographic group (e.g., females, 18-30), which is then used to calculate the impressions attributable to the market segment for one or more of the more detailed demographic groups in the combined groups. Disclosed examples may combine demographic groups multiple times (e.g., combine females 21-24 and females 18-20 to females 18-24, combine females 18-24 and females 25-30 to females 18-30, etc.). Combination may be performed at any level(s) in a hierarchy of demographic groups and/or may be performed on portions of any level(s) in the hierarchy of demographic groups, as described in more detail below. Combining multiple demographic groups increases the sample size and improves the precision for the resulting estimated market segment share. However, each collapse of two or more demographic groups sacrifices granularity and/or potentially increases bias error of the demographic information attributable to the media impressions. By selecting the appropriate granularity and/or sample size, disclosed examples enable determining market segment share for media impressions that occur on mobile devices with an precision that was unattainable using previous methods.

Examples disclosed herein may be used with the Online Campaign Ratings (OCR) systems developed by The Nielsen Company (US), LLC.

Disclosed example methods involve receiving, at a first Internet domain, a first request from a computing device. In the disclosed example methods, the first request is indicative of access to media at the computing device. The disclosed example methods further involve requesting demographic information from a database proprietor, where the demographic information corresponds to the first request. The disclosed example methods further involve determining a number of media impressions that occurred on mobile devices and that are attributable to a first demographic group, where the number of media impressions is based on attributions of the media impressions to the first demographic group by the database proprietor in the demographic information. The disclosed example methods further involve determining whether a first size of a first audience that corresponds to the first demographic group satisfies a threshold, the first audience including panelists in an audience measurement panel maintained by an audience measurement entity. The disclosed example methods further involve determining whether a second size of a second audience satisfies the threshold when the first size of the first audience does not satisfy the threshold. In the disclosed example methods, the second audience includes panelists in the audience measurement panel corresponding to a second demographic group, the first audience is a subset of the second audience, and the first demographic group is a subset of the second demographic group. The disclosed example methods further involve calculating a portion of the media impressions attributable to a market segment and to the second demographic group, based on a portion of the second audience that belongs to the market segment, when the second size of the second audience satisfies the threshold.

In some disclosed example methods, the threshold includes a minimum number of panel audience members. In some disclosed examples, the first demographic group includes one of multiple age and gender groups, and the second demographic group includes a combination of the multiple age and gender groups. In some such example methods, the audience measurement panel comprises a television audience measurement panel.

Some disclosed example methods further involve determining whether a size of a third audience that corresponds to a third demographic group satisfies the threshold, the third audience comprising panelists in the audience measurement panel, where the third audience is a subset of the second audience and the third demographic group is a subset of the second demographic group. When the size of the third audience satisfies the threshold and the size of the first audience does not satisfy the threshold, such example methods further involve calculating a second portion of the media impressions attributable to both the market segment and the third demographic group based on a portion of the third audience that belongs to the market segment, and calculating a portion of the media impressions attributable to both the market segment and the first demographic group based on the portion of the second audience that belongs to the market segment.

In some disclosed example methods calculating the portion of the media impressions involves multiplying a) the portion of the second audience belonging to the market segment and b) an audience size for the second demographic group, where the second demographic group is determined based on i) demographic information obtained from the database proprietor and ii) a number of media impressions counted at an impression collector, to calculate a portion of the second audience that belongs to both the market segment and the second demographic group. In some such example methods, calculating the portion of the media impressions involves multiplying an impression frequency determined from the database proprietor and the portion of the second audience that belongs to both the market segment and the second demographic group.

Some disclosed example methods further involve conserving at least one of computing resources or network resources by calculating the portion of the media impressions attributable to the market segment and to the second demographic group without communicating with non-panel online users to request survey responses about their personal details related to the market segment.

Disclosed example apparatus include an impression collector, a demographics determiner, a precision determiner, and a market segment calculator. In disclosed example apparatus, the impression collector receives, at a first Internet domain, a first request from a computing device, where the first request is indicative of access to media at the computing device. In the disclosed example apparatus, the impression collector also requests demographic information from a database proprietor, where the demographic information corresponding to the first request. In the disclosed example apparatus, the demographics determiner determines a number of media impressions that occurred on mobile devices and that are attributable to a first demographic group. In the disclosed example apparatus, the number of media impressions is based on attributions of the media impressions to the first demographic group by the database proprietor in the demographic information. In the disclosed example apparatus, the precision determiner determines whether a first size of a first audience that corresponds to the first demographic group satisfies a threshold, where the first audience includes panelists in an audience measurement panel maintained by an audience measurement entity. In the disclosed example apparatus, the precision determiner also determines whether a second size of a second audience satisfies the threshold when the first size of the first audience does not satisfy the threshold, where the second audience includes panelists in the audience measurement panel and corresponds to a second demographic group. In the disclosed example apparatus, the first audience is a subset of the second audience and the first demographic group is a subset of the second demographic group. In the disclosed example apparatus, the market segment calculator calculates a portion of the media impressions attributable to a market segment and to the second demographic group, based on a portion of the second audience that belongs to the market segment, when the second size of the second audience satisfies the threshold.

In some disclosed examples, the threshold is a minimum audience size. In some example apparatus, the first demographic group includes one of multiple age and gender groups, and the second demographic group includes a combination of the multiple age and gender groups. In some examples, the audience measurement panel comprises a television audience measurement panel.

In some disclosed example apparatus, the precision determiner determines whether a third size of a third audience that corresponds to a third demographic group satisfies the threshold, where the third audience includes panelists in the audience measurement panel. In such disclosed example apparatus, the third audience is a subset of the second audience, and the third demographic group is a subset of the second demographic group. In such example apparatus, when the third size of the third audience satisfies the threshold and the first size of the first audience does not satisfy the threshold: the market segment calculator calculates a second portion of the media impressions attributable to both the market segment and the second demographic group based on a portion of the third audience that belongs to the market segment and calculates a portion of the media impressions attributable to both the market segment and the first demographic group based on the portion of the second audience that belongs to the market segment.

In some disclosed example apparatus, the market segment calculator calculates the portion of the media impressions by multiplying a) the portion of the second audience belonging to the market segment and b) an audience size for the second demographic group determined based on i) demographic information obtained from the database proprietor and ii) a number of media impressions counted at the impression collector, to calculate a portion of the second audience that belongs to both the market segment and the second demographic group. In some such example apparatus, the market segment calculator calculates the portion of the media impressions by multiplying an impression frequency determined from the database proprietor and the portion of the second audience that belongs to both the market segment and the second demographic group.

In some disclosed example apparatus, the market segment calculator conserves at least one of computing resources or network resources by calculating the portion of the media impressions attributable to the market segment and to the second demographic group without communicating with non-panel online users to request survey responses about their personal details related to the market segment.

While examples disclosed herein are described with reference to compensating or adjusting impression information obtained from mobile devices, the examples are also applicable to non-mobile devices such as desktop computers, televisions, video game consoles, set top boxes, and/or other devices.

Examples disclosed herein can be applied to incoming data in real-time or substantially real-time (e.g., within seconds or minutes of receiving the data), and may be used to attribute impression information to market segments (e.g., impressions, duration units) for any desirable time period (e.g., hourly, daily, weekly, monthly, etc.) and/or cumulatively (e.g., applied to impressions and/or duration units collected over numerous time periods). Therefore, examples disclosed herein may provide accurate market segment information to advertisers and/or media distributors to enable more rapid adjustment of media campaign strategies to fit measured market segments than known methods.

Impression and Demographic Information Collection

FIG. 1 depicts an example system 100 to collect user information (e.g., user information 102a, 102b) from distributed database proprietors 104a, 104b for associating with impressions of media presented at a client device 106. In the illustrated examples, user information 102a, 102b or user data includes one or more of demographic data, purchase data, and/or other data indicative of user activities, behaviors, and/or preferences related to information accessed via the Internet, purchases, media accessed on electronic devices, physical locations (e.g., retail or commercial establishments, restaurants, venues, etc.) visited by users, etc. Examples disclosed herein are described in connection with the client device 106 being a mobile device, which may be a mobile phone, a mobile communication device, a tablet, a gaming device, a portable media presentation device, etc. However, examples disclosed herein may be implemented in connection with non-mobile devices such as Internet appliances, smart televisions, Internet terminals, computers, or any other device capable of presenting media received via network communications.

In the illustrated example of FIG. 1, to track media impressions on the client device 106, an audience measurement entity (AME) 108 partners with or cooperates with an app publisher 110 to download and install a data collector 112 on the client device 106. The app publisher 110 of the illustrated example may be a software app developer that develops and distributes apps to mobile devices and/or a distributor that receives apps from software app developers and distributes the apps to mobile devices. The data collector 112 may be included in other software loaded onto the client device 106, such as the operating system (OS) 114, an application (or app) 116, a web browser 117, and/or any other software. The example client device 106 of FIG. 1 is a non-locally metered device. That is, the client device 106 does not support and/or has not been provided with dedicated metering software (e.g., metering software provided by the AME 108).

Any of the example software 114-117 may present media 118 received from a media publisher 120. The media 118 may be an advertisement, video, audio, text, a graphic, a web page, news, educational media, entertainment media, and/or any other type of media. In the illustrated example, a media ID 122 is provided in the media 118 to enable identifying the media 118 so that the AME 108 can credit the media 118 with media impressions when the media 118 is presented on the client device 106 or any other device that is monitored by the AME 108.

The data collector 112 of the illustrated example includes instructions (e.g., Java, java script, or any other computer language or script) that, when executed by the client device 106, cause the client device 106 to collect the media ID 122 of the media 118 presented by the app program 116 and/or the client device 106, and to collect one or more device/user identifier(s) 124 stored in the client device 106. The device/user identifier(s) 124 of the illustrated example include identifiers that can be used by corresponding ones of the partner database proprietors 104a-b to identify the user or users of the client device 106, and to locate user information 102a-b corresponding to the user(s). For example, the device/user identifier(s) 124 may include hardware identifiers (e.g., an international mobile equipment identity (IMEI), a mobile equipment identifier (MEID), a media access control (MAC) address, etc.), an app store identifier (e.g., a Google Android ID, an Apple ID, an Amazon ID, etc.), an open source unique device identifier (OpenUDID), an open device identification number (ODIN), a login identifier (e.g., a username), an email address, user agent data (e.g., application type, operating system, software vendor, software revision, etc.), third-party service identifiers (e.g., advertising service identifiers, device usage analytics service identifiers, demographics collection service identifiers), web storage data, document object model (DOM) storage data, local shared objects (also referred to as "Flash cookies"), etc. In some examples, fewer or more device/user identifier(s) 124 may be used. In addition, although only two partner database proprietors 104a-b are shown in FIG. 1, the AME 108 may partner with any number of partner database proprietors to collect distributed user information (e.g., the user information 102a-b).

In some examples, the client device 106 may not allow access to identification information stored in the client device 106. For such instances, the disclosed examples enable the AME 108 to store an AME-provided identifier (e.g., an identifier managed and tracked by the AME 108) in the client device 106 to track media impressions on the client device 106. For example, the AME 108 may provide instructions in the data collector 112 to set an AME-provided identifier in memory space accessible by and/or allocated to the app program 116, and the data collector 112 uses the identifier as a device/user identifier 124. In such examples, the AME-provided identifier set by the data collector 112 persists in the memory space even when the app program 116 and the data collector 112 are not running. In this manner, the same AME-provided identifier can remain associated with the client device 106 for extended durations. In some examples in which the data collector 112 sets an identifier in the client device 106, the AME 108 may recruit a user of the client device 106 as a panelist, and may store user information collected from the user during a panelist registration process and/or collected by monitoring user activities/behavior via the client device 106 and/or any other device used by the user and monitored by the AME 108. In this manner, the AME 108 can associate user information of the user (from panelist data stored by the AME 108) with media impressions attributed to the user on the client device 106.

In the illustrated example, the data collector 112 sends the media ID 122 and the one or more device/user identifier(s) 124 as collected data 126 to the app publisher 110. Alternatively, the data collector 112 may be configured to send the collected data 126 to another collection entity (other than the app publisher 110) that has been contracted by the AME 108 or is partnered with the AME 108 to collect media ID's (e.g., the media ID 122) and device/user identifiers (e.g., the device/user identifier(s) 124) from mobile devices (e.g., the client device 106). In the illustrated example, the app publisher 110 (or a collection entity) sends the media ID 122 and the device/user identifier(s) 124 as impression data 130 to an impression monitoring server 132 at the AME 108. The impression data 130 of the illustrated example may include one media ID 122 and one or more device/user identifier(s) 124 to report a single impression of the media 118, or it may include numerous media ID's 122 and device/user identifier(s) 124 based on numerous instances of collected data (e.g., the collected data 126) received from the client device 106 and/or other mobile devices to report multiple impressions of media.

In the illustrated example, the impression monitoring server 132 stores the impression data 130 in an AME media impressions store 134 (e.g., a database or other data structure). Subsequently, the AME 108 sends the device/user identifier(s) 124 to corresponding partner database proprietors (e.g., the partner database proprietors 104a-b) to receive user information (e.g., the user information 102a-b) corresponding to the device/user identifier(s) 124 from the partner database proprietors 104a-b so that the AME 108 can associate the user information with corresponding media impressions of media (e.g., the media 118) presented at mobile devices (e.g., the client device 106).

In some examples, to protect the privacy of the user of the client device 106, the media identifier 122 and/or the device/user identifier(s) 124 are encrypted before they are sent to the AME 108 and/or to the partner database proprietors 104a-b. In other examples, the media identifier 122 and/or the device/user identifier(s) 124 are not encrypted.

After the AME 108 receives the device/user identifier(s) 124, the AME 108 sends device/user identifier logs 136a-b to corresponding partner database proprietors (e.g., the partner database proprietors 104a-b). In some examples, each of the device/user identifier logs 136a-b may include a single device/user identifier, or it may include numerous aggregate device/user identifiers received over time from one or more mobile devices. After receiving the device/user identifier logs 136a-b, each of the partner database proprietors 104a-b looks up its users corresponding to the device/user identifiers 124 in the respective logs 136a-b. In this manner, each of the partner database proprietors 104a-b collects user information 102a-b corresponding to users identified in the device/user identifier logs 136a-b for sending to the AME 108. For example, if the partner database proprietor 104a is a wireless service provider and the device/user identifier log 136a includes IMEI numbers recognizable by the wireless service provider, the wireless service provider accesses its subscriber records to find users having IMEI numbers matching the IMEI numbers received in the device/user identifier log 136a. When the users are identified, the wireless service provider copies the users' user information to the user information 102a for delivery to the AME 108.

In some other examples, the data collector 112 is configured to collect the device/user identifier(s) 124 from the client device 106. The example data collector 112 sends the device/user identifier(s) 124 to the app publisher 110 in the collected data 126, and it also sends the device/user identifier(s) 124 to the media publisher 120. In such other examples, the data collector 112 does not collect the media ID 122 from the media 118 at the client device 106 as the data collector 112 does in the example system 100 of FIG. 1. Instead, the media publisher 120 that publishes the media 118 to the client device 106 retrieves the media ID 122 from the media 118 that it publishes. The media publisher 120 then associates the media ID 122 to the device/user identifier(s) 124 received from the data collector 112 executing in the client device 106, and sends collected data 138 to the app publisher 110 that includes the media ID 122 and the associated device/user identifier(s) 124 of the client device 106. For example, when the media publisher 120 sends the media 118 to the client device 106, it does so by identifying the client device 106 as a destination device for the media 118 using one or more of the device/user identifier(s) 124 received from the client device 106. In this manner, the media publisher 120 can associate the media ID 122 of the media 118 with the device/user identifier(s) 124 of the client device 106 indicating that the media 118 was sent to the particular client device 106 for presentation (e.g., to generate an impression of the media 118).

In some other examples in which the data collector 112 is configured to send the device/user identifier(s) 124 to the media publisher 120, the data collector 112 does not collect the media ID 122 from the media 118 at the client device 106. Instead, the media publisher 120 that publishes the media 118 to the client device 106 also retrieves the media ID 122 from the media 118 that it publishes. The media publisher 120 then associates the media ID 122 with the device/user identifier(s) 124 of the client device 106. The media publisher 120 then sends the media impression data 130, including the media ID 122 and the device/user identifier(s) 124, to the AME 108. For example, when the media publisher 120 sends the media 118 to the client device 106, it does so by identifying the client device 106 as a destination device for the media 118 using one or more of the device/user identifier(s) 124. In this manner, the media publisher 120 can associate the media ID 122 of the media 118 with the device/user identifier(s) 124 of the client device 106 indicating that the media 118 was sent to the particular client device 106 for presentation (e.g., to generate an impression of the media 118). In the illustrated example, after the AME 108 receives the impression data 130 from the media publisher 120, the AME 108 can then send the device/user identifier logs 136a-b to the partner database proprietors 104a-b to request the user information 102a-b as described above in connection with FIG. 1.

Although the media publisher 120 is shown separate from the app publisher 110 in FIG. 1, the app publisher 110 may implement at least some of the operations of the media publisher 120 to send the media 118 to the client device 106 for presentation. For example, advertisement providers, media providers, or other information providers may send media (e.g., the media 118) to the app publisher 110 for publishing to the client device 106 via, for example, the app program 116 when it is executing on the client device 106. In such examples, the app publisher 110 implements the operations described above as being performed by the media publisher 120.

Additionally or alternatively, in contrast with the examples described above in which the client device 106 sends identifiers to the audience measurement entity 108 (e.g., via the application publisher 110, the media publisher 120, and/or another entity), in other examples the client device 106 (e.g., the data collector 112 installed on the client device 106) sends the identifiers (e.g., the user/device identifier(s) 124) directly to the respective database proprietors 104a, 104b (e.g., not via the AME 108). In such examples, the example client device 106 sends the media identifier 122 to the audience measurement entity 108 (e.g., directly or through an intermediary such as via the application publisher 110), but does not send the media identifier 122 to the database proprietors 104a-b.

As mentioned above, the example partner database proprietors 104a-b provide the user information 102a-b to the example AME 108 for matching with the media identifier 122 to form media impression information. As also mentioned above, the database proprietors 104a-b are not provided copies of the media identifier 122. Instead, the client provides the database proprietors 104a-b with impression identifiers 140. An impression identifier uniquely identifies an impression event relative to other impression events of the client device 106 so that an occurrence of an impression at the client device 106 can be distinguished from other occurrences of impressions. However, the impression identifier 140 does not itself identify the media associated with that impression event. In such examples, the impression data 130 from the client device 106 to the AME 108 also includes the impression identifier 140 and the corresponding media identifier 122. To match the user information 102a-b with the media identifier 122, the example partner database proprietors 104a-b provide the user information 102a-b to the AME 108 in association with the impression identifier 140 for the impression event that triggered the collection of the user information 102a-b. In this manner, the AME 108 can match the impression identifier 140 received from the client device 106 to a corresponding impression identifier 140 received from the partner database proprietors 104a-b to associate the media identifier 122 received from the client device 106 with demographic information in the user information 102a-b received from the database proprietors 104a-b. The impression identifier 140 can additionally be used for reducing or avoiding duplication of demographic information. For example, the example partner database proprietors 104a-b may provide the user information 102a-b and the impression identifier 140 to the AME 108 on a per-impression basis (e.g., each time a client device 106 sends a request including an encrypted identifier 124-b and an impression identifier 140 to the partner database proprietor 104*a-b*) and/or on an aggregated basis (e.g., send a set of user information 102*a-b*, which may include indications of multiple impressions at a mobile device 102*a-b* (e.g., multiple impression identifiers 140), to the AME 108 presented at the client device 106).

The impression identifier 140 provided to the AME 108 enables the AME 108 to distinguish unique impressions and avoid overcounting a number of unique users and/or devices viewing the media. For example, the relationship between the user information 102*a* from the partner A database proprietor 104*a* and the user information 102*b* from the partner B database proprietor 104*b* for the client device 106 is not readily apparent to the AME 108. By including an impression identifier 140 (or any similar identifier), the example AME 108 can associate user information corresponding to the same user between the user information 102*a-b* based on matching impression identifiers 140 stored in both of the user information 102*a-b*. The example AME 108 can use such matching impression identifiers 140 across the user information 102*a-b* to avoid overcounting mobile devices and/or users (e.g., by only counting unique users instead of counting the same user multiple times).

A same user may be counted multiple times if, for example, an impression causes the client device 106 to send multiple user/device identifiers to multiple different database proprietors 104*a-b* without an impression identifier (e.g., the impression identifier 140). For example, a first one of the database proprietors 104*a* sends first user information 102*a* to the AME 108, which signals that an impression occurred. In addition, a second one of the database proprietors 104*b* sends second user information 102*b* to the AME 108, which signals (separately) that an impression occurred. In addition, separately, the client device 106 sends an indication of an impression to the AME 108. Without knowing that the user information 102*a-b* is from the same impression, the AME 108 has an indication from the client device 106 of a single impression and indications from the database proprietors 104*a-b* of multiple impressions.

To avoid overcounting impressions, the AME 108 can use the impression identifier 140. For example, after looking up user information 102*a-b*, the example partner database proprietors 104*a-b* transmit the impression identifier 140 to the AME 108 with corresponding user information 102*a-b*. The AME 108 matches the impression identifier 140 obtained directly from the client device 106 to the impression identifier 140 received from the database proprietors 104*a-b* with the user information 102*a-b* to thereby associate the user information 102*a-b* with the media identifier 122 and to generate impression information. This is possible because the AME 108 received the media identifier 122 in association with the impression identifier 140 directly from the client device 106. Therefore, the AME 108 can map user data from two or more database proprietors 104*a-b* to the same media exposure event, thus avoiding double counting.

Each unique impression identifier 140 in the illustrated example is associated with a specific impression of media on the client device 106. The partner database proprietors 104*a-b* receive the respective user/device identifiers 124 and generate the user information 102*a-b* independently (e.g., without regard to others of the partner database proprietors 104*a-b*) and without knowledge of the media identifier 122 involved in the impression. Without an indication that a particular user demographic profile in the user information 102*a* (received from the partner database proprietor 104*a*) is associated with (e.g., the result of) the same impression at the client device 106 as a particular user demographic profile in the user information 102*b* (received from the partner database proprietor 104*b* independently of the user information 102*a* received from the partner database proprietor 104*a*), and without reference to the impression identifier 140, the AME 108 may not be able to associate the user information 102*a* with the user information 102*b* and/or cannot determine that the different pieces of user information 102*a-b* are associated with a same impression and could, therefore, count the user information 102*a* and the user information 102*b* as corresponding to two different users/devices and/or two different impressions.

The above examples illustrate methods and apparatus for collecting impression data at an audience measurement entity (or other entity). The examples discussed above may be used to collect impression information for any type of media, including static media (e.g., advertising images), streaming media (e.g., streaming video and/or audio, including content, advertising, and/or other types of media), and/or other types of media. For static media (e.g., media that does not have a time component such as images, text, a webpage, etc.), the example AME 108 records an impression once for each occurrence of the media being presented, delivered, or otherwise provided to the client device 106. For streaming media (e.g., video, audio, etc.), the example AME 108 measures demographics for media occurring over a period of time. For example, the AME 108 (e.g., via the app publisher 110 and/or the media publisher 120) provides beacon instructions to a client application or client software (e.g., the OS 114, the web browser 117, the app 116, etc.) executing on the client device 106 when media is loaded at client application/software 114-117. In some examples, the beacon instructions cause the client application/software 114-117 to transmit a request (e.g., a pingback message) to an impression monitoring server at regular and/or irregular intervals (e.g., every minute, every 30 seconds, every 2 minutes, etc.). By monitoring and/or counting the requests occurring at intervals, the example AME 108 monitors the duration of individual impressions of duration-based media (e.g., video, audio, etc.). The example AME 108 may determine the numbers of impressions (e.g., initial loads) of the duration-based media, the unique audience of duration-based media, and/or the total duration (in units, such as seconds or minutes) of the duration-based media viewed in the numbers of impressions. As used herein, the term "impression information" may include impressions and/or duration units. The example impression monitoring server 132 identifies the requests from the web browser 117 and, in combination with one or more database proprietors, matches the impression information for the media with demographics of the user of the web browser 117.

In some examples, a user loads (e.g., via the browser 117) a web page from a web site publisher, in which the web page corresponds to a particular 60 minute video. As a part of or in addition to the example web page, the web site publisher causes the data collector 112 to send a pingback message (e.g., a beacon request) to a beacon server 142 by, for example, providing the browser 117 with beacon instructions. For example, when the beacon instructions are executed by the example browser 117, the beacon instructions cause the data collector 112 to send pingback messages (e.g., beacon requests, hypertext transfer protocol (HTTP) requests, pings) to the impression monitoring server 132 at designated intervals (e.g., once every minute or any other suitable interval). The example beacon instructions (or a redirect message from, for example, the impression monitoring server 132 or a database proprietor 104*a-b*) further cause the data collector 112 to send pingback messages or beacon requests to one or more database proprietors 104*a-b* that collect and/or maintain demographic information about users. The database proprietor 104*a-b* transmits demographic information about the user associated with the data collector 112 for combining or associating with the impression determined by the impression monitoring server 132. If the user closes the web page containing the video before the end of the video, the beacon instructions are stopped, and the data collector 112 stops sending the pingback messages to the impression monitoring server 132. In some examples, the pingback messages include timestamps and/or other information indicative of the locations in the video to which the numerous pingback messages correspond. By determining a number and/or content of the pingback messages received at the impression monitoring server 132 from the client device 106, the example impression monitoring server 132 can determine that the user watched a particular length of the video (e.g., a portion of the video for which pingback messages were received at the impression monitoring server 132).

The client device 106 of the illustrated example executes a client application/software 114-117 that is directed to a host website (e.g., www.acme.com) from which the media 118 (e.g., audio, video, interactive media, streaming media, etc.) is obtained for presenting via the client device 106. In the illustrated example, the media 118 (e.g., advertisements and/or content) is tagged with identifier information (e.g., a media ID 122, a creative type ID, a placement ID, a publisher source uniform resource locator (URL), etc.) and a beacon instruction. The example beacon instruction causes the client application/software 114-117 to request further beacon instructions from a beacon server 142 that will instruct the client application/software 114-117 on how and where to send beacon requests to report impressions of the media 118. For example, the example client application/software 114-117 transmits a request including an identification of the media 118 (e.g., the media identifier 122) to the beacon server 142. The beacon server 142 then generates and returns beacon instructions 144 to the example client device 106. Although the beacon server 142 and the impression monitoring server 132 are shown separately, in some examples the beacon server 142 and the impression monitoring server 132 are combined. In the illustrated example, beacon instructions 144 include URLs of one or more database proprietors (e.g., one or more of the partner database proprietors 104*a-b*) or any other server to which the client device 106 should send beacon requests (e.g., impression requests). In some examples, a pingback message or beacon request may be implemented as an HTTP request. However, whereas a transmitted HTTP request identifies a webpage or other resource to be downloaded, the pingback message or beacon request includes the audience measurement information (e.g., ad campaign identification, content identifier, and/or device/user identification information) as its payload. The server to which the pingback message or beacon request is directed is programmed to log the audience measurement data of the pingback message or beacon request as an impression (e.g., an ad and/or content impression depending on the nature of the media tagged with the beaconing instructions). In some examples, the beacon instructions received with the tagged media 118 include the beacon instructions 144. In such examples, the client application/software 114-117 does not need to request beacon instructions 144 from a beacon server 142 because the beacon instructions 144 are already provided in the tagged media 118.

When the beacon instructions 144 are executed by the client device 106, the beacon instructions 144 cause the client device 106 to send beacon requests (e.g., repeatedly at designated intervals) to a remote server (e.g., the impression monitoring server 132, the media publisher 120, the database proprietors 104*a-b*, or another server) specified in the beacon instructions 144. In the illustrated example, the specified server is a server of the audience measurement entity 108, namely, at the impression monitoring server 132. The beacon instructions 144 may be implemented using Javascript or any other types of instructions or script executable via a client application (e.g., a web browser) including, for example, Java, HTML, etc.

The example AME 108 of FIG. 1 further includes a panel database 146 to store panel and/or panelist information. Example panel and/or panelist information includes demographic data, market segment data, and device usage information about individual panelists and/or panelist households. The example panel database 146 may be updated by a panel data collector 148 based on collection of audience information for television audience measurement, radio audience measurement, online audience measurement, mobile audience measurement, and/or cross-platform (or multi-platform) audience measurement. The example panel data collector 148 may collect panel data using the methods and apparatus disclosed in Topchy, et al., U.S. Pat. No. 8,369,972, Thomas et al., U.S. Pat. No. 5,481,294, and/or Ellis et al., U.S. Pat. No. 5,504,518. The entireties of U.S. Pat. Nos. 8,369,972, 5,481,294, and 5,504,518 are incorporated herein by reference. However, any other past, present, or future techniques for collecting panel audience measurement data may be used.

Examples that may be used to implement the system of FIG. 1 are disclosed in U.S. patent application Ser. No. 14/127,414, filed on Aug. 28, 2013, U.S. patent application Ser. No. 14/261,085, filed on Apr. 24, 2014, U.S. Provisional Patent Application Ser. No. 61/952,726, filed on Mar. 13, 2014, U.S. Provisional Patent Application Ser. No. 61/979,391, filed on Apr. 14, 2014, U.S. Provisional Patent Application Ser. No. 61/986,784, filed on Apr. 30, 2014, U.S. Provisional Patent Application Ser. No. 61/991,286, filed on May 9, 2014, and U.S. Provisional Patent Application Ser. No. 62/014,659, filed Jun. 19, 2014. The entireties of U.S. patent application Ser. No. 14/127,414, U.S. patent application Ser. No. 14/261,085, U.S. Provisional Patent Application Ser. No. 61/952,726, U.S. Provisional Patent Application Ser. No. 61/979,391, U.S. Provisional Patent Application Ser. No. 61/986,784, U.S. Provisional Patent Application Ser. No. 61/991,286, and U.S. Provisional Patent Application Ser. No. 62/014,659 are incorporated by reference herein.

Attributing Impression Information to Market Segments

The examples of FIGS. 2-6 below may be used to estimate a share of the impression counts, the unique audience sizes, and/or the duration units, which are determined as described above with reference to FIG. 1, that are attributable to a market segment of interest. Because accurate market segment information is often not available from the database proprietors 104*a-b*, the example methods and apparatus of FIGS. 2-6 use market segment information from other sources, such as audience measurement panels for television, radio, and/or online audience measurements. Examples disclosed below verify that the panel audiences from which the market segment information is to be drawn satisfies requirements to enhance the reliability (e.g., precision) of the impression and/or audience attributions. The examples may be used to calculate impression counts, duration units, and/or unique audience sizes attributable to the market segments using demographic groups that satisfy the precision thresholds (e.g., are based on audience sample sizes exceeding established thresholds).

Figure 2:
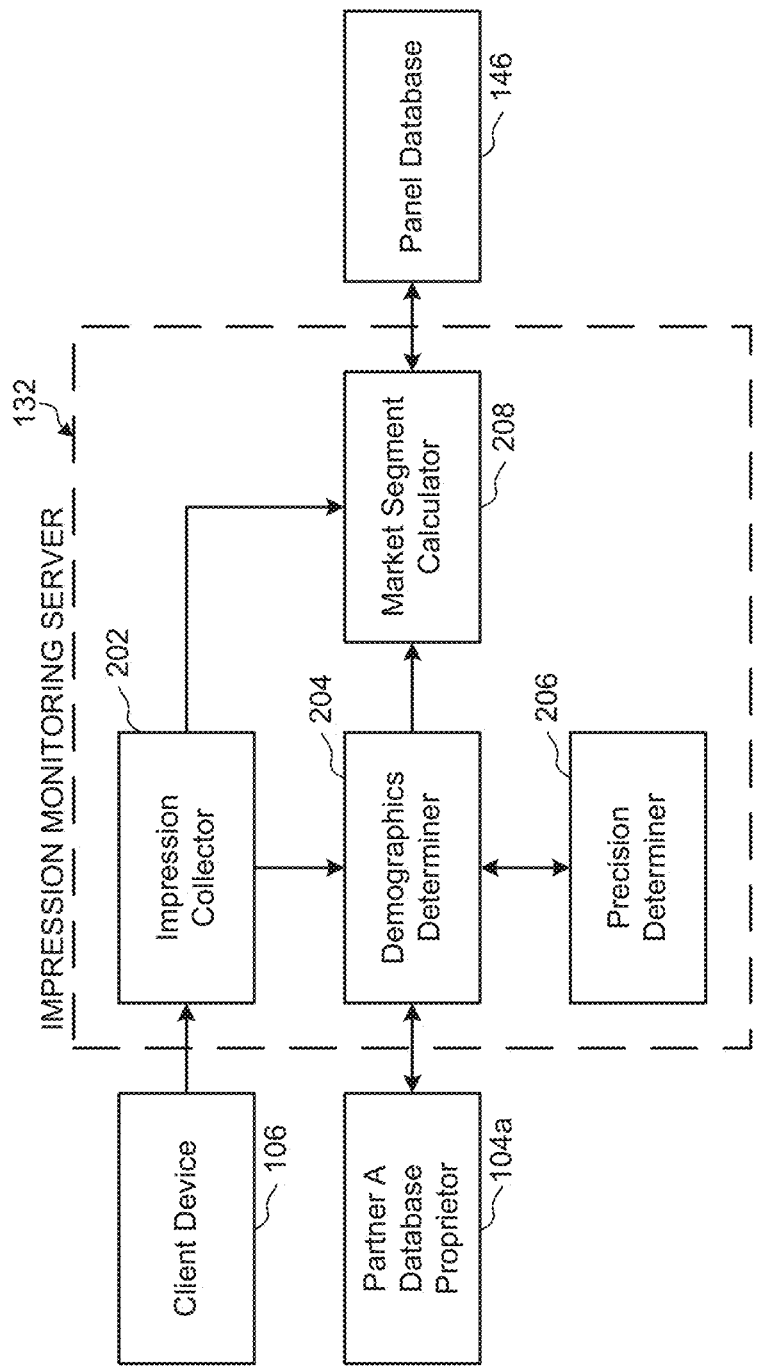
FIG. 2 is a more detailed block diagram of an example implementation of the example impression monitoring server of FIG. 1.

FIG. 2 is a block diagram of an example implementation of the example impression monitoring server 132 of FIG. 1. As discussed above, the example impression monitoring server 132 of FIG. 2 attributes impressions to demographic groups and/or determines audience sizes of demographic groups. Additionally, the example impression monitoring server 132 of FIG. 2 determines portions of impressions and/or portions of audiences (e.g., audience members) that are attributable to one or more designated market segments (also referred to as "market breaks").

The example impression monitoring server 132 of FIG. 1 includes an impression collector 202, a demographics determiner 204, a precision determiner 206, and a market segment calculator 208.

The example impression collector 202 of FIG. 2 receives impression requests from mobile devices, such as the client device 106 as described above with reference to FIG. 1. The impression requests received at the impression collector 202 are indicative of accesses to media at the mobile devices. For example, the requests may include impression data 130 such as one or more media IDs 122 and/or one or more device/user identifier(s) 124 to report impressions.

The impression requests may be implemented, for example, as HTTP requests. However, whereas a transmitted HTML request identifies a webpage or other resource to be downloaded, the impression request includes the audience measurement information (e.g., ad campaign identification, a content identifier, and/or user identification information) as its payload. The example impression requests are dummy HTTP requests requesting a resource (e.g., a web page) but to which a web page is not served by the impression collector 202. The dummy HTTP request serves as an impression request that effectively requests the impression collector 202 to log an impression for corresponding accessed media that is identified in the dummy HTTP impression request.

The example impression collector 202 of FIG. 2 sends requests for demographic information (e.g., to the database proprietor(s) 104a-104b). The requests for demographic information correspond to the mobile devices that send dummy requests (e.g., to an Internet domain associated with the AME 108). For example, the impression collector 202 may send one request for demographic information (e.g., to the database proprietor(s) 104a-104b) corresponding to multiple requests received from the mobile devices. Additionally or alternatively, the impression collector 202 may send requests for demographic information for each request received from a mobile device (e.g., on a one for one basis). In any case, the impression collector 202, in turn, receives demographic information corresponding to the mobile devices e.g., from the database proprietor(s) 104a-104b) and logs the demographic information in association with corresponding ones of the logged impressions.

The example demographics determiner 204 of FIG. 2 determines a number of media impressions that occurred on mobile devices and that are attributable to a demographic group based on the information collected by the impression collector 202. For example, the demographics determiner 204 determines the number of media impressions attributable to a given demographic group based on the demographic data provided by a database proprietor (e.g., the database proprietor 104a of FIG. 1). For example, the demographics determiner 204 determines media impressions that are attributable to a demographic group based on the user information 102a received from the database proprietor 104a by correcting the data for any bias (e.g., misattribution bias that incorrectly attributes to one demographic group one or more impressions that are correctly attributable to another demographic group, non-coverage bias that corrects for the fact that not all persons that cause impressions are recognizable by the database proprietor 104a, etc.) and/or by scaling the corrected user information to match an observed number of impressions for the media. Example methods and apparatus that may be used to implement the demographics determiner 204 are disclosed in U.S. patent application Ser. No. 14/560,947, filed Dec. 4, 2014. The entirety of U.S. patent application Ser. No. 14/560,947 is incorporated by reference herein.

The example precision determiner 206 of FIG. 2 determines whether the size of a panel audience results in an unacceptable precision (e.g., a sample size smaller than a threshold sample size) when used to estimate the number of impressions attributable to a particular market segment. For example, the precision determiner 206 determines whether a size of a panel audience that corresponds to a demographic group of interest (e.g., there are X people in the panel that fall into the male, ages 35-39 (M35-39) demographic group) satisfies a threshold. In some examples, the panel audience includes a set of panelists in an audience measurement panel maintained by an audience measurement entity (e.g., the AME 108) of FIG. 1. In the example of FIG. 2, the precision determiner 206 compares the size of the panel audience to a threshold size that is calculated to provide an lower acceptable sample size for attributions of impression counts, duration units, and/or audience sizes to demographic groups and/or market segments.

When the precision determiner 206 determines that the size of the panel audience (that corresponds to the demographic group of interest) does not satisfy the threshold at a higher level of granularity (e.g., the first level), the example precision determiner 206 determines whether the size of a second, larger audience at a lower level of granularity (e.g., the second level, the third level, etc.) satisfies the threshold. In particular, the precision determiner 206 uses as the second audience a larger set of panelists from the audience measurement panel that includes the first set of panelists plus additional panelists that correspond to a larger (e.g., less granular) demographic group. For example, if the demographic group of the first set was an M35-39 (male, ages 35-39) demographic group, the precision determiner 206 may create the second set by widening the age demographic to use panel audience panelists in the group M35-54 (male, ages 35-54). Alternatively, the precision determiner 206 may widen the gender category to include persons (i.e., male and female) ages 35-39 in the second group. Alternatively, the precision determiner 206 may widen both the gender and the age categories such that the second set of panelists are those panelists who are persons of either gender and are ages 35-54. In other words, the precision determiner 206 selects the second set of panelists having less granular demographics panel audience than the first group of panelists. The first set of panelists is a subset of the second set of panelists. The example precision determiner 206 may generate any number of demographic granularity levels (e.g., 2, 3, 4, or more), testing increasingly larger sets of panelists until the precision determiner 206 identifies a set of panelists that satisfies the threshold.

In some examples, precision determiner 206 includes non-demographic based requirements in addition to the panel audience size, such as a requirement to have a certain number of mobile devices and/or type(s) of mobile devices present in the household of the audience members. Such requirements may be instituted to improve the representation of the overall population by the panel audience. In such examples, an audience member may be excluded from the panel audience (referred to as a set of panelists above) if the audience member and/or the household of the audience member do not meet the non-demographic based requirements. The precision determiner 206 determines whether the panel audience for a demographic group, excluding those panel audience members that are in the demographic group but do not meet the non-demographic based criteria, satisfies the threshold (e.g., is at least a minimum number of audience members). If not, the precision determiner 206 may cause the demographics determiner 204 to select a panel audience for a demographic group that includes a larger number of panel audience members, as discussed in more detail below.

The example market segment calculator 208 of FIG. 2 calculates numbers of impressions that are attributable to a market segment. The example market segment calculator 208 determines the numbers of impressions for the market segment of interest for individual demographic groups. For example, if the market segment of interest is persons having a household income between $50,000 and $59,999 (e.g., $50 k-$59.9 k), the example market segment calculator 208 of the illustrated example determines the impressions attributable to each of the demographic groups persons and the proportion of persons in each of the demographics groups who have a household income between $50 k-$59.9 k in the highest-granularity panel audience that has at least the lower (e.g., minimum) acceptable sample size. Using the female, ages 21-24 (F21-24) demographic group as an example, the market segment calculator 208 determines a number of impressions attributable to the F21-24 demographic group, determines which granularity level has a panel size of least the threshold size (e.g., the F21-24 demographic group, the F21-30 demographic group, or the Persons, 2-99 demographic group), and calculates a number of impressions attributable to persons in the F21-24 demographic group who have a household income between $50 k-$59.9 k based on the impressions attributable to the F21-24 demographic group and the proportion of persons at the determined granularity level who have a household income between $50 k-$59.9 k.

In some examples, such as when a higher-granularity demographic level panel audience does not have enough panelists to result in an acceptable sample size in the calculation of attributable impressions, the market segment calculator 208 calculates the portion of the media impressions that are attributable to the market segment and the demographic group by multiplying a) the proportion of the panel audience at a lower-granularity demographic level that includes the panel audience at the higher-granularity demographic level and that belongs to the market segment and b) a number of impressions attributable to the demographic group at the highest-granularity demographic level. For example, if the market segment calculator 208 determines that the F21-24 panel audience (e.g., at highest granularity level) would not result in an acceptable sample size for determining the impressions attributable to the market segment of interest and the F21-24 demographic group, the market segment calculator 208 selects a demographic group at the next-highest granularity level that includes the F21-24 demographic group, such as the F21-30 demographic group. The market segment calculator 208 then calculates the portion of the media impressions for the F21-24 attributable to the market segment of interest by multiplying a) the proportion of persons in the F21-30 panel audience who belong to the market segment of interest and b) the media impressions attributable to the F21-24 panel audience. If the F21-30 panel audience also does not provide an acceptable sample size, the example market segment calculator 208 may repeat the calculation using the next-highest granularity demographic level to determine the proportion of the panel audience that belongs to the market segment of interest, while also using the media impressions attributable to the F21-24 panel audience.

The example market segment calculator 208 determines the total audience size (e.g., not limited to the panel audience) for each demographic group based on, for example, information obtained from a database proprietor (e.g., the database proprietor 104a of FIG. 1) and a number of media impressions counted at the impression collector 202. Example demographic information that may be used to calculate the total audience size includes counts of persons identified by the database proprietor 104a in each demographic group, and the number of impressions attributed to each of the demographic groups by the database proprietor 104a. In some examples, the market segment calculator 208 calculates the portion of the media impressions attributable to a demographic group and a market segment of interest by multiplying an impression frequency determined from the database proprietor 104a for the demographic group by the total audience (e.g., number of audience members) that belongs to both the market segment and the demographic group.

In the example of FIG. 2, the precision determiner 206 selects the highest-granularity level panel audience to be used by the market segment calculator 208 for a demographic group when the size of the panel audience for that demographic group satisfies a sample size threshold that corresponds to an acceptable precision. When the highest-granularity level panel audience for a demographic group does not satisfy the threshold, the example precision determiner 206 selects a panel audience at a lower granularity level to be used by the market segment calculator 208, based on the level having the highest demographic group granularity at which the panel audience size satisfies the threshold. For example, when the precision determiner 206 determines that the size of the panel audience at the second-highest granularity level (e.g., F21-30) satisfies the threshold, the example market segment calculator 208 calculates the portion of the media impressions that are attributable to the market segment of interest and to the demographic group (e.g., F21-30, income $50 k-$59.9 k) based on a portion of the panel audience in the demographic group at the second-highest granularity level (e.g., F21-30) that belongs to the market segment (e.g., income $50 k-$59.9 k).

The example precision determiner 206 selects the highest granularity level for each demographic group at which the panel audience satisfies the threshold, regardless of whether the precision determiner 206 selects a lower-granularity level for other demographic groups (e.g., where the selected lower-granularity level may include other demographic groups for which the highest granularity level may be selected). For example, the precision determiner 206 may determine that, for a M25-29 demographic group, a lower-granularity level "persons 21-34" panel audience is to be used to achieve satisfactory precision. However, rather than using the "persons 21-34" demographic group for each of the demographic groups falling within the "persons 21-34" lower-granularity level demographic group, the example precision determiner 206 selects the highest-granularity level demographic groups for the demographic groups for which the corresponding panel audience satisfies the threshold (e.g., the M21-24, M30-34, F21-24, F25-29, and F30-34 demographic groups).

Table 1 below illustrates an example approach for estimating market section audiences by device type, and in total (across device types, and across TV households and Cross-Platform Homes (CPH)). The example market segment calculator 208 of FIG. 2 may use the inputs, outputs, and/or computations shown and described below with reference to Table 2 to calculate impression counts, duration units, and/or audience sizes associated with a market segment of interest.

TABLE 2

Example Approach for Estimating Market Segment Audiences for Mobile Device Impressions

| Detailed Reference | Simplified Reference | Definition/Computation |
|---|---|---|
| $P_{db}$ | A | Panel audience size (units) for $d^{th}$ demo category, $b^{th}$ market segment. Input. |
| $P_d$ | B | Panel audience size (units) for $d^{th}$ demo category. Input. |
| $C_{dt}$ | C | Calibrated census audience size (units) for $d^{th}$ demo category, $t^{th}$ mobile device type. Input. |
| $D_{dbt}$ | D | Mobile audience size (units) for $d^{th}$ demo category, $b^{th}$ market break, $t^{th}$ mobile device type. $$D = C \times \frac{A}{B} \text{ or } D_{dbt} = C_{dt} \times \frac{P_{db}}{P_d}$$ |
| $D_{db}$ | E | Mobile audience size (units) for $d^{th}$ demo category, $b^{th}$ market segment (E = sum of D across device types, or $D_{db} = \sum_t D_{dbt}$) |
| $T_{db}$ | F | Existing audience size (units) for $d^{th}$ demo category, $b^{th}$ market segment. The composition of this audience may vary by service and/or client. Input. |
| $S_{db}$ | G | TV + PC + Mobile audience size (units) for $d^{th}$ demo category, $b^{th}$ market segment. G = F + E = $T_{db} + D_{db}$ |

In Table 2 above, A (or $P_{db}$) is a panel audience for the $d^{th}$ demographic group (e.g., females of ages 18-21 (F18-21), females of ages 18-30 (F18-30), persons of age 2 and over, etc.) and the $b^{th}$ market segment (e.g., household income $50,000-59,999). In Table 2 above, B (or Pa) is a panel audience for the $d^{th}$ demographic group. Therefore, the ratio A/B is the portion (e.g., percentage or fraction) of the $d^{th}$ demographic group made up by the $b^{th}$ market segment. A and B above are obtained from an audience panel (e.g., panel-based), such as a statistically-selected television audience panel, a statistically-selected PC audience panel, and/or a statistically selected radio audience panel maintained by an audience measurement entity such as The Nielsen Company. The audience may be, for example, the number of persons in the panel audience that fit the criteria (e.g., the $d^{th}$ demographic group, the $b^{th}$ market segment, etc.).

The panel audience A (or $P_{db}$) and the panel audience B (or $P_d$) are obtained from the demographics determiner 204 based on a demographic group selected by the precision determiner 206 (e.g., at a level that results in a satisfactory precision). For example, when the precision determiner 206 selects a demographic group level (e.g., a granularity level), the example demographics determiner 204 determines a number of persons in the panel audience that are known to be in the $d^{th}$ demographic group (e.g., the demographic group of interest, a lower-granularity-level demographic group that includes the demographic group of interest, etc.) and the $b^{th}$ market segment. The example market segment calculator 208 obtains A and B from the panel database 146 based on a demographic group selected by the precision determiner 206.

In Table 2 above, C (or $C_{dt}$) is a calibrated census audience size (or impression counts) for the $d^{th}$ demographic group and the $t^{th}$ device type out of n device types (e.g., device types $t_1, t_2, \ldots t_n$). The example demographics determiner 204 of FIG. 2 determines the calibrated census audience size (or impression counts) C by attributing media audience members and/or impressions to demographic groups based on, for example, demographic information received from a database proprietor (e.g., the database proprietor 104a of FIG. 1) to which people have provided (e.g., self-reported) such demographic information. The example precision determiner 206 indicates the demographic group d to the demographics determiner 204, based on the demographic group d used to obtain A and B.

In some examples, the demographics determiner 204 converts the media impression count and/or the duration unit count to a unique audience size using a frequency measure determined for the $d^{th}$ demographic group (e.g., by the database proprietor, by the audience measurement entity, etc.). As used herein, frequency is defined to refer to the ratio of an impression count to a unique audience size. Therefore, frequency may be considered an average number of impressions per person in the audience. A value for C may be a number of media impressions obtained using the example methods and apparatus disclosed in U.S. patent application Ser. No. 14/560,947.

In Table 2 above, D (or $D_{dbt}$) is a calculated value representing a mobile audience size (or number of impressions) for the $d^{th}$ demographic group, the $b^{th}$ market segment, and the $t^{th}$ device type. The example market segment calculator 208 of FIG. 2 calculates D as $$D = C \times \frac{A}{B} \left( \text{or } D_{dbt} = C_{dt} \times \frac{P_{db}}{P_d} \right).$$

In Table 2 above, E (or $D_{db}$) is a mobile audience size (or number of impressions) for the $d^{th}$ demographic group and the $b^{th}$ market segment. The example market segment calculator 208 calculates E as the sum of D (or $D_{dbt}$) for all of the device types $t_1$-$t_n$. For example, the market segment calculator 208 may calculate E using the formula $$E = \sum_t D \left( \text{or } D_{db} = \sum_t D_{dbt} \right).$$

In Table 2 above, F (or Tab) is the existing audience size for the $d^{th}$ demographic group and the $b^{th}$ market segment. The existing audience size refers to an audience size for media presented using a different platform than the platform represented by D in Table 2 above. For example, the market segment calculator 208 obtains the existing audience F as an audience for the media of interest for devices not included in the set of device types $t_1$-$t_n$. For example, if the set of device types $t_1$-$t_n$ include mobile device types such as smartphones, tablet computers, and/or portable media players, the existing audience F may reflect audiences of device types such as desktop computers, televisions, and/or radios.

Existing audience sizes may be different based on the particular service (e.g., national vs local service). For example, in national reporting, the existing audience size may include TV-only audience (or radio only), or may include combined TV and PC (or radio and PC) audiences depending on the networks' respective participation in extended access programs that monitor media access on devices such as personal computers. As an example for local reporting, existing audience sizes may only include TV audiences (or radio audiences).

Example methods and apparatus for determining an audience for computing devices are disclosed in U.S. Pat. No. 6,108,637 to Blumenau. Example methods and apparatus for determining an audience for television and/or radio are described in U.S. Pat. No. 5,481,294 to Thomas et al. and/or U.S. Pat. No. 5,504,518 to Ellis et al. The entireties of U.S. Pat. Nos. 6,108,637, 5,481,294, and U.S. Pat. No. 5,504,518 are incorporated herein by reference.

In Table 2 above, G is a total of the mobile audience size (e.g., E or $D_{db}$) and existing audience size (e.g., F or $T_{db}$) for the market segment for the $d^{th}$ demographic group and the $b^{th}$ market segment. In the example above, the market segment calculator 208 calculates G using the equation $G=F+E=T_{db}+D_{db}$. Therefore, the above example can provide an audience for a market segment of interest for media impressions occurring on mobile devices and/or for total accesses of the media across devices (e.g., mobile devices, non-mobile computing devices, television, radio, etc.). The example market segment calculator 208 may calculate the audience for the market segment of interest in one or more selected demographic groups using the panel audiences selected by the precision determiner 206 for each of the selected demographic groups. Additionally or alternatively, the market segment calculator 208 may sum the audiences across multiple demographic groups to determine the audience for the entire market segment of interest.

As discussed above, the example precision determiner 206 determines the sample size associated with the panel-based market segment calculations to determine whether the sample size traverses a threshold. The data source of the panel-based share (e.g., the data source, such as a television audience measurement panel, used to obtain A and B in Table 2 above) and the demographic granularity level at which the share is computed, are based on the numbers of viewers and availability of the panel data. Availability of panel data refers to whether audience measurement panel data can be obtained from a desired source for a demographic group. The demographic granularity level refers to the granularity of the demographic groups used to determine the market segment share. For example, the females of ages 18-21, females of ages 21-24, females of ages 24-27, and females of ages 28-30 demographic groups at a first demographic granularity level all have a higher granularity than a females of ages 18-30 demographic group at a second demographic granularity level and/or a persons of ages 2+ (e.g., male and female, ages 2 and up) demographic group at a third demographic granularity level. Table 3 below illustrates example sets of demographic groups at three different demographic granularity levels.

TABLE 3

Example Granularity Levels
Demographic Granularity Levels 1-3

| Demographic Granularity Level 1 | Demographic Granularity Level 2 | Demographic Granularity Level 3 |
|---|---|---|
| Female, age 2-5 | Children, age 2-11 | Persons, age 2+ |
| Female, age 6-8 | | |
| Female, age 9-11 | | |
| Female, age 12-14 | Teens, age 12-17 | |
| Female, age 15-17 | | |
| Female, age 18-20 | Persons, age 18-24 | |
| Female, age 21-24 | | |
| Female, age 25-29 | Persons, age 25-34 | |
| Female, age 30-34 | | |
| Female, age 35-39 | Persons, age 35-54 | |
| Female, age 40-44 | | |
| Female, age 45-49 | | |
| Female, age 50-54 | | |
| Female, age 55-64 | Persons, age 55+ | |
| Female, age 65+ | | |
| Male, age 2-5 | Children, age 2-11 | |
| Male, age 6-8 | | |
| Male, age 9-11 | | |
| Male, age 12-14 | Teens, age 12-17 | |
| Male, age 15-17 | | |
| Male, age 18-20 | Persons, age 18-24 | |
| Male, age 21-24 | | |
| Male, age 25-29 | Persons, age 25-34 | |
| Male, age 30-34 | | |
| Male, age 35-39 | Persons, age 35-54 | |
| Male, age 40-44 | | |
| Male, age 45-49 | | |
| Male, age 50-54 | | |
| Male, age 55-64 | Persons, age 55+ | |
| Male, age 65+ | | |

In the example of Table 3 above, each granularity level is a surjection of the immediately preceding level (e.g., Demographic Granularity Level 1 precedes Demographic Granularity Level 2 in the example Table 3 above). In other words, each demographic group at one demographic granularity level in Table 3 above (e.g., the female, ages 12-14 demographic group in Demographic Granularity Level 1) fits into (or is mapped to) a demographic group at each of the higher demographic granularity levels in Table 3 above (e.g., Teens, ages 12-17 in Demographic Granularity Level 2, Persons 2+ in Demographic Granularity Level 3).

At each demographic granularity level in Table 3 above, the market segment calculator 208 determines the market segment share of impressions and/or audience members based on the ratio of market segment projected audience (or impressions) (e.g., A in Table 1 above) to total projected audience (or impressions) (e.g., B in Table 1 above).

In some examples, the precision determiner 206 uses a hierarchical approach so that the demographic granularity level expected to be most highly correlated with mobile viewing by the market segment is considered first. Thus, the example market segment calculator 208 calculates the mobile audience size (or impressions) E for the $d^{th}$ demographic group and the $b^{th}$ market segment according to Table 1 above for the demographic groups d at Demographic Granularity Level 1 of Table 3 above. For example, the example demographics determiner 204 provides the market segment projected audience A and the total projected audience B of Table 1 above are obtained for each of the 30 demographic groups at Demographic Granularity Level 1 of Table 3 above. The calibrated census audience size C of Table 1 above is also obtained for each of the 30 demographic groups d at Demographic Granularity Level 1 of Table 3 above. The example market segment calculator 208 calculates the mobile audience size D of Table 1 for each of the 30 demographic groups d at Demographic Granularity Level 1 of Table 3 above. The market segment calculator 208 calculates the mobile audience size (or number of impressions) E of Table 1 for each of the 30 demographic groups d at Demographic Granularity Level 1 of Table 3 above.

In some examples, if the precision determiner 206 determines that the threshold for the panel audience B of Table 1 above (e.g., a minimum audience) is not satisfied for one or more of the demographic groups at a particular demographic granularity level, the example market segment calculator 208 uses another demographic granularity level (e.g., a less granular level having more panelists) to calculate the impressions and/or audience for the market segment. For example, the precision determiner 206 may compare the panel audience B to the threshold prior to the market segment calculator 208 calculating the mobile audience size (or number of impressions) E at that demographic granularity level.

For example, if the precision determiner 206 determines that a first demographic group (e.g., female, ages 18-20) at Demographic Granularity Level 1 of Table 3 above has a panel audience (e.g., B of Table 1 above) of fewer than an example threshold of 30 people, then the precision determiner 206 determines whether the next demographic granularity level (e.g., Demographic Granularity Level 2 of Table 3 above) has a panel audience of fewer than the example threshold. In this example, the precision determiner 206 would determine whether the Persons, ages 18-24 demographic group audience has at least 30 people. If the Persons, ages 18-24 demographic group audience has at least 30 people, the example precision determiner 206 instructs the market segment calculator to use the Persons, ages 18-24 demographic group to determine the market segment projected audience A and the total projected audience B to calculate the mobile audience (or number of impressions) E for the female, ages 18-20 demographic group. The market segment calculator 208 would then obtain the panel audience A for the Persons, ages 18-24 demographic group and the panel audience B for the Persons, ages 18-24 demographic group from the panel database 146.

In some examples, the Demographic Granularity Levels and demographic groups in each of the levels may be defined using an established audience panel such as the Nielsen National TV Ratings panel. However, other panels may be used that have a correlation between the panel member behavior and mobile device user behavior that is higher than, for example, the correlation between the Nielsen National TV Ratings panel and mobile device user behavior.

In some examples, the market segment calculator 208 calculates separate shares for the same market segment for different time-shifted viewing streams. A time-shifted viewing stream refers to media that is accessed from a source of time-shifted media access, such as a particular web site, a particular service, or a particular mobile device application. Time-shifted refers to accessing archived or recorded media at a later time and/or date relative to the time/date at which the media was broadcast or distributed for real-time access during a scheduled time/date. In some other examples, the market segment calculator 208 calculates a single share for the market segment based on a single stream, and the single share is then utilized for all measured time-shifted viewing streams.

Table 4 below illustrates another example set of granularity levels that may be used by the example market segment calculator 208 to calculate a share of impressions and/or audience for a market segment. The example granularity levels of Table 4 below may be used to measure market segment share for, for example, local media telecasts (as opposed to national media telecasts) on local stations (e.g., national network affiliates).

TABLE 4

Alternative Example Granularity Levels
Local

| Granularity Level | Household-level Device Requirement | Demo | Tuning Segment |
| --- | --- | --- | --- |
| 1 | All TV panel homes | BB | Day/Station/¼ hour |
| 2 | All TV panel homes | Demo (6) | Day/Station/¼ hour |
| 3 | All TV panel homes | P2+ | Day/Station/¼ hour |
| 4 | All TV panel homes | BB | Day/Station/½ hour |
| 5 | All TV panel homes | Demo (6) | Day/Station/½ hour |
| 6 | All TV panel homes | P2+ | Day/Station/½ hour |
| 7 | All TV panel homes | BB | Day/Station/1 hour |
| 8 | All TV panel homes | Demo (6) | Day/Station/1 hour |
| 9 | All TV panel homes | P2+ | Day/Station/1 hour |

In the example of Table 4 above, BB refers to a set of "building block" demographic categories, such as the set of national building block demographic categories (e.g., age/gender groups) used in the Nielsen National TV Ratings panel. The BB demographic groups are an example of a "most granular" set of demographic groups in the granularity levels, and may be replaced with other sets of demographic groups based on panel data availability. In the example of Table 4 above, Demo (6) refers to the example demographic groups in Demographic Granularity Level 2 of Table 3 above, including: 1) Children, ages 2-11; 2) Teens, ages 12-17; 3) Persons, ages 18-24; 4) Persons, ages 25-34; 5) Persons, ages 35-54; and 6) Persons, ages 55+. In the example of Table 4 above, the Day/Station/Time period (e.g., ¼ hour, ½ hour, 1 hour) refers to the local station, day, and day-part (e.g., a designated ¼ hour, a designated ½ hour, a designated hour, etc.) from which the panel audience is estimated or determined. For example, an audience measured from a panel on a particular ¼ hour (e.g., 5:00 P.M.-5:15 P.M., etc.) of a particular day (e.g., Friday, Friday, Nov. 28, 2014, etc.) from a particular station (e.g., a local CBS affiliate station) may be used.

Using the example granularity levels of Table 4, the example precision determiner 206 first tests the panel audience size (e.g., B of Table 1) at granularity level 1 (e.g., BB demographic groups, with the panel audience determined from the day/station/¼ hour corresponding to the media impression) to determine whether each of the example demographic groups in BB have at least a threshold panel audience (e.g., whether the panel audience B of Table 1 above is greater than a threshold audience size). If not all of the demographic groups (BB) have at least the threshold panel audience, the example precision determiner 206 tests the panel audience size at granularity level 2 (e.g., Demo (6) demographic groups, with the panel audience determined from the day/station/¼ hour corresponding to the media impression).

If the third example granularity level of Table 4 above (e.g., persons of ages 2+, with the panel audience determined from the day/station/¼ hour corresponding to the media impression) does not have at least a threshold panel audience size, the example granularity level 4 is used, which increases the day-part time frame to ½ hour and returns to test the demographic groups at the highest level of granularity (e.g., the BB demographic groups).

The example precision determiner 206 progresses through the panel audience size at each subsequent granularity level (e.g., levels 1-9 of Table 4 above) until the precision determiner 206 determines that the granularity level has a panel audience size that meets the threshold for all of the demographic groups at the granularity level. When the precision determiner 206 identifies a granularity level that has a panel audience size that meets the threshold for all of the demographic groups, the example market segment calculator 208 obtains the market segment projected audience A, the total projected audience B, and the calibrated census audience size C of Table 1 above for the demographic groups at the identified granularity level and the market segment of interest.

For example, if all of the demographic groups in Demo (6) of Table 4 satisfy the threshold for the panel audience size at the ¼ hour day-part, the example market segment calculator 208 obtains 6 sets of data for each of the market segment projected audience A, the total projected audience B, and the calibrated census audience size C. The example market segment calculator 208 calculates values for the mobile audience (or number of impressions) E for each of the six demographic groups as described above. In some examples, the market segment calculator 208 obtains multiple values of the calibrated census audience size C and/or multiple values of the mobile audience size (or number of impressions) D are calculated for each demographic group d for the multiple device types t of Table 1 above. For example, a first value of the calibrated census audience size C may be obtained for a first device type and a second value of the calibrated census audience size C may be obtained for a second device type.

Figure 3:
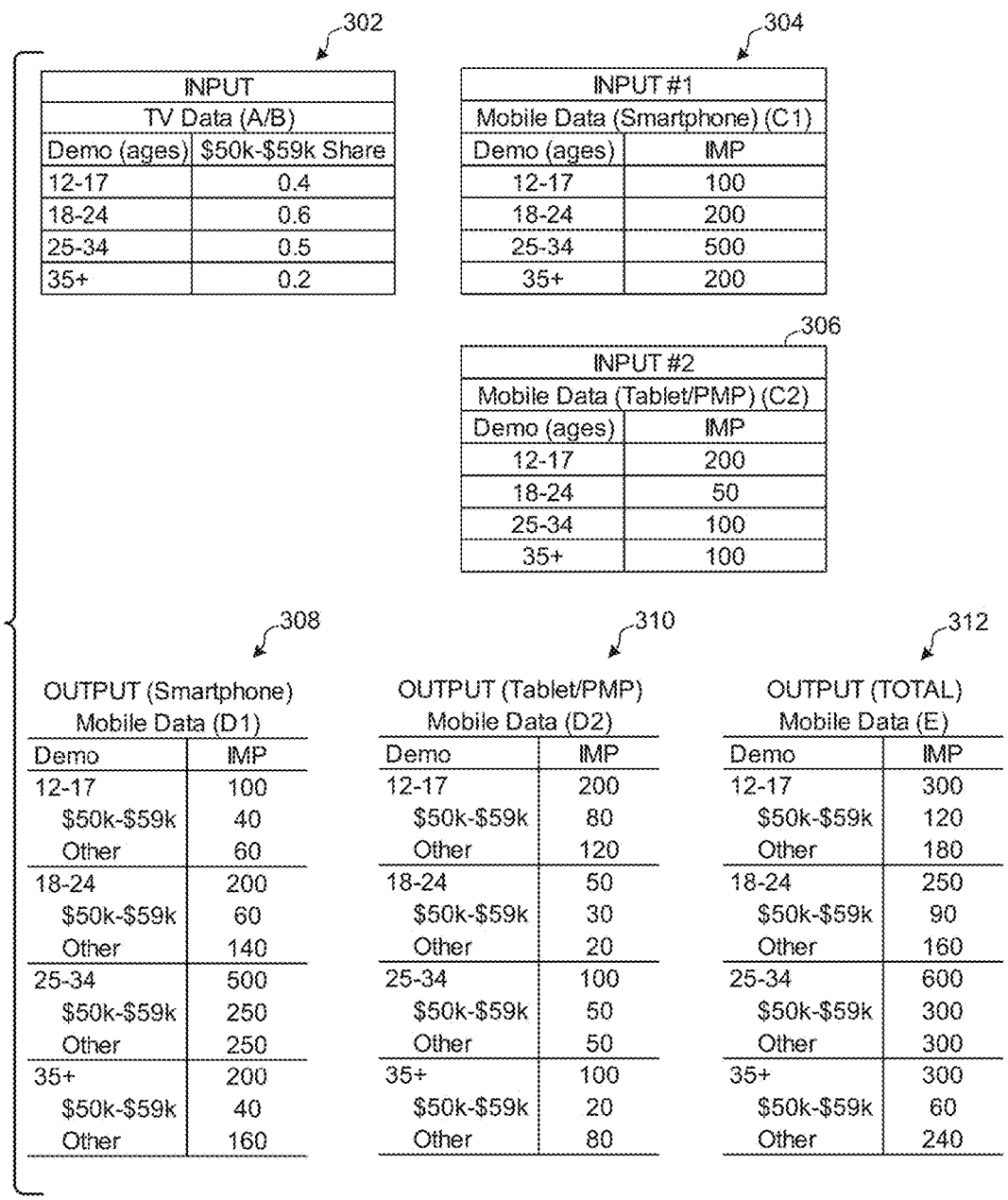
FIG. 3 illustrates example input data and resulting output data to attribute impressions and/or audience sizes to market segments and/or demographic groups.

FIG. 3 illustrates an example estimation of a mobile device audience as described in Table 1 that may be performed by the example market segment calculator 208 for example demographic categories (e.g., agers 12-17, 18-24, 25-34, and 35+), example device types (e.g., smartphones (SP) and tablets/personal media players (PMPs)), and an example market segment (e.g., household income $50,000-59,999). A first input table 302 includes ratios of A/B (e.g., based on A and B of Table 1 above) for four example age-based demographic categories (e.g., agers 12-17, 18-24, 25-34, and 35+) of a TV audience. In the example table 302, the ratio A/B is used to calculate the mobile audience size (or number of impressions) D in Table 1 above for the $d^{th}$ demographic group and the $b^{th}$ market segment is received instead of separate data elements A and B.

A second input table 304 includes impressions for the example age-based demographic categories and the example device type of "smartphone." Similarly, a third input table 306 includes impressions for the example age-based demographic categories and the example device type of "tablet/personal media player (PMP)." The input tables 304, 306 of FIG. 3 correspond to the calibrated census audience size C input data of Table 1 above. The example input tables 304, 306 may be obtained from the demographics determiner 204 based on the impressions collected by the impressions collector 202 and/or demographic information received from the partner database proprietor 104a of FIG. 2.

Using the first input table 302 and the second input table 304, the example market segment calculator 208 calculates the impressions (D1) for the smartphone type and for the example market segment to generate the output table 308 for the smartphone device type. The values in the output table 308 correspond to the number of impressions (or audience size) D in Table 1 above. For example, the market segment calculator 208 multiplies the 100 impressions (C1) in the ages 12-17 demographic group in the table 304 by 0.4 (e.g., the ratio A/B) in the ages 12-17 demographic group in table 302 to equal 40 impressions (D1) in the table 308.

Similarly, using the first input table 302 and the third input table 306, the example market segment calculator 208 calculates the impressions (D2) for the tablet/personal media player device type for the market segment to generate table 310 for the tablet/personal media player device type. For example, the market segment calculator 208 multiplies the 200 impressions (C2) in the ages 12-17 demographic group in the table 306 by 0.4 (e.g., the ratio A/B) in the ages 12-17 demographic group in table 302 to equal 80 impressions (D2) in the table 310.

The example output tables 308, 310 of FIG. 3 also include corresponding numbers of impressions for market segments other than the selected market segment (e.g., as a consequence of computing the numbers of impressions for the market segment of interest).

The example market segment calculator 208 further computes the impression counts for each of the demographic groups for all of the device types (e.g., E of Table 1) by summing the impressions (D1+D2) for each of the device types per demographic group. The output of the calculation of E is shown in table 312 of FIG. 3. For example, the total impression counts (E) for all device types for the 12-17 demographic group and the $50,000-59,999 market segment is the sum of the impressions for the ages 12-17 demographic group and the $50,000-59,999 market segment for the smartphone device type (e.g., output table 308, or D1) and the impressions for the ages 12-17 demographic group and the $50,000-59,999 market segment for the tablet/portable media player device type (e.g., output table 310, or D2).

In some cases, some demographic groups at a particular granularity level may have at least the threshold panel audience while others of the demographic groups at that granularity level do not have the threshold panel audience. In some examples, each demographic group uses the panel audience size (e.g., A and/or B) for the applicable demographic group having the highest granularity. Using the example of Table 3 above, all of the example demographic groups female of ages 25-29, female of ages 30-34, male of ages 25-29, and male of ages 0-34 are in the Demographic Granularity Level 1 and also map to the demographic group Persons of ages 25-34 in Demographic Granularity Level 2. Assume, for example, each of the demographic groups female of ages 25-29, female of ages 30-34, and male of ages 25-29 have a panel audience size (e.g., B of Table 1 above) that is less than the threshold. Also assume that the example demographic group male of ages 30-34 has a panel audience size that is greater than the threshold. For the example demographic groups female of ages 25-29, female of ages 30-34, male of ages 25-29, the sample size is insufficient at Demographic Granularity Level 1 to provide an acceptable precision of a resulting mobile device audience if the panel audience size is used for those demographic groups. Therefore, the panel audience for the Persons of ages 25-34 demographic group is used to calculate the mobile device audience (e.g., E of Table 1 above) for the demographic groups female of ages 25-29, female of ages 30-34, male of ages 25-29. However, because the panel audience size for the male of ages 30-34 demographic group is greater than the threshold, the panel audience size for the male of ages 30-34 group is used (instead of the Persons of ages 25-34 demographic group used for the other demographic groups) to calculate the mobile device audience (e.g., E of Table 1 above).

Using the less granular Demographic Granularity Level 2 to calculate the mobile device audience for the demographic groups female of ages 25-29, female of ages 30-34, male of ages 25-29, as in the example above, could result in a higher bias or error for the calculated mobile device audience for these groups (e.g., due to less correlation between the panel audience behavior and the mobile device user behavior), but increases the precision. In contrast, because the sample size of the audience in the male of ages 30-34 demographic group is sufficiently large, the mobile device audience for the male of ages 30-34 demographic group has a lower bias while also having a precision within defined limits.

While an example manner of implementing the impression monitoring server 132 of FIG. 1 is illustrated in FIG. 2, one or more of the elements, processes and/or devices illustrated in FIG. 2 may be combined, divided, re-arranged, omitted, eliminated and/or implemented in any other way. Further, the example impression collector 202, the example demographics determiner 204, the example precision determiner 206, the example market segment calculator 208 and/or, more generally, the example impression monitoring server 132 of FIG. 2 may be implemented by hardware, software, firmware and/or any combination of hardware, software and/or firmware. Thus, for example, any of the example impression collector 202, the example demographics determiner 204, the example precision determiner 206, the example market segment calculator 208 and/or, more generally, the example impression monitoring server 132 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example impression collector 202, the example demographics determiner 204, the example precision determiner 206, and/or the example market segment calculator 208 is/are hereby expressly defined to include a tangible computer readable storage device or storage disk such as a memory, a digital versatile disk (DVD), a compact disk (CD), a Blu-ray disk, etc. storing the software and/or firmware. Further still, the example impression monitoring server 132 of FIG. 1 may include one or more elements, processes and/or devices in addition to, or instead of, those illustrated in FIG. 2, and/or may include more than one of any or all of the illustrated elements, processes and devices.

Figure 4:
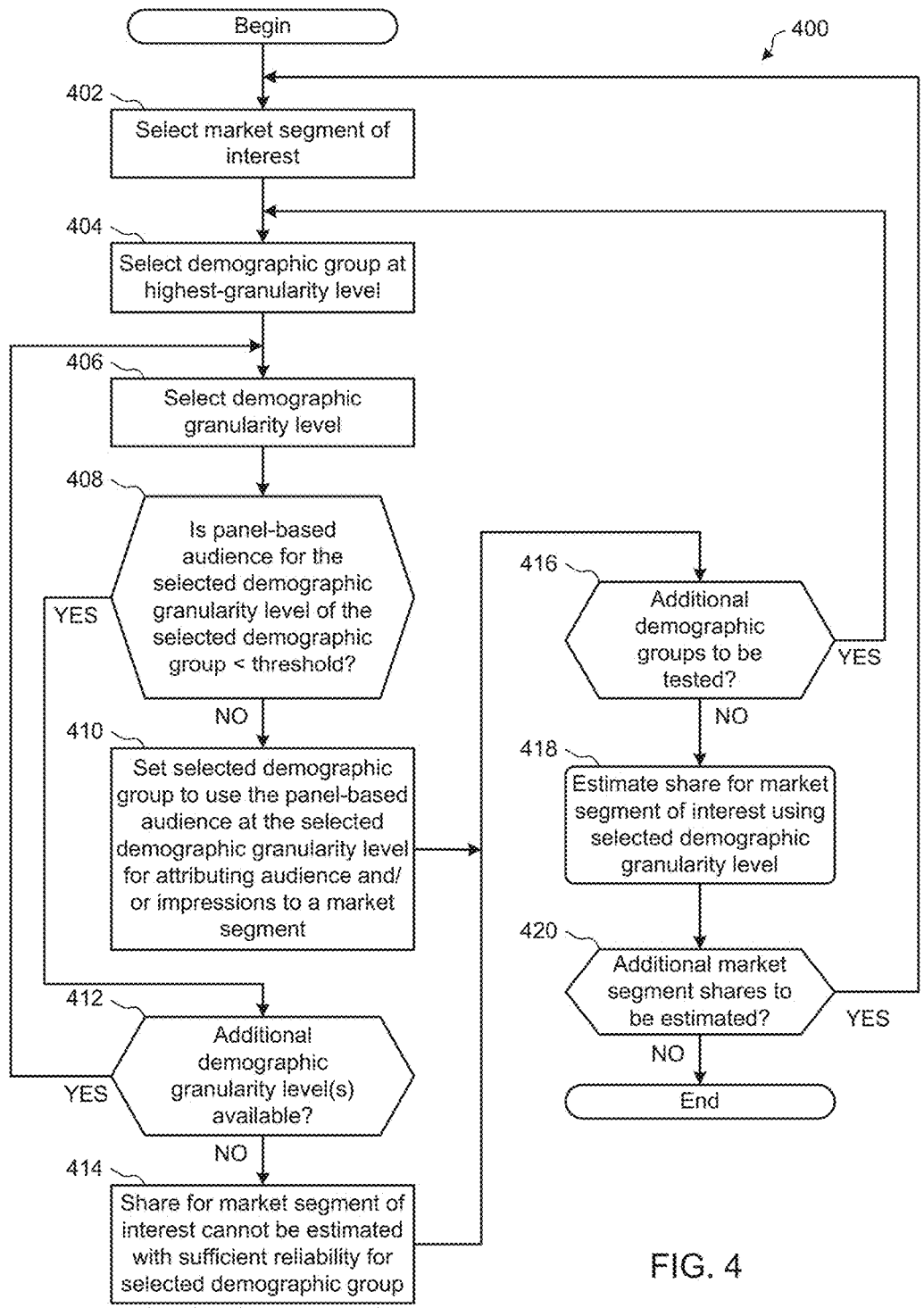
FIG. 4 is a flow diagram representative of example computer readable instructions which may be executed to implement the example impression monitoring server of FIGS. 1 and/or 2 to select a panel audience based on a set of demographic groups at multiple granularity levels to be used to attribute impressions to a market segment.
Figure 5:
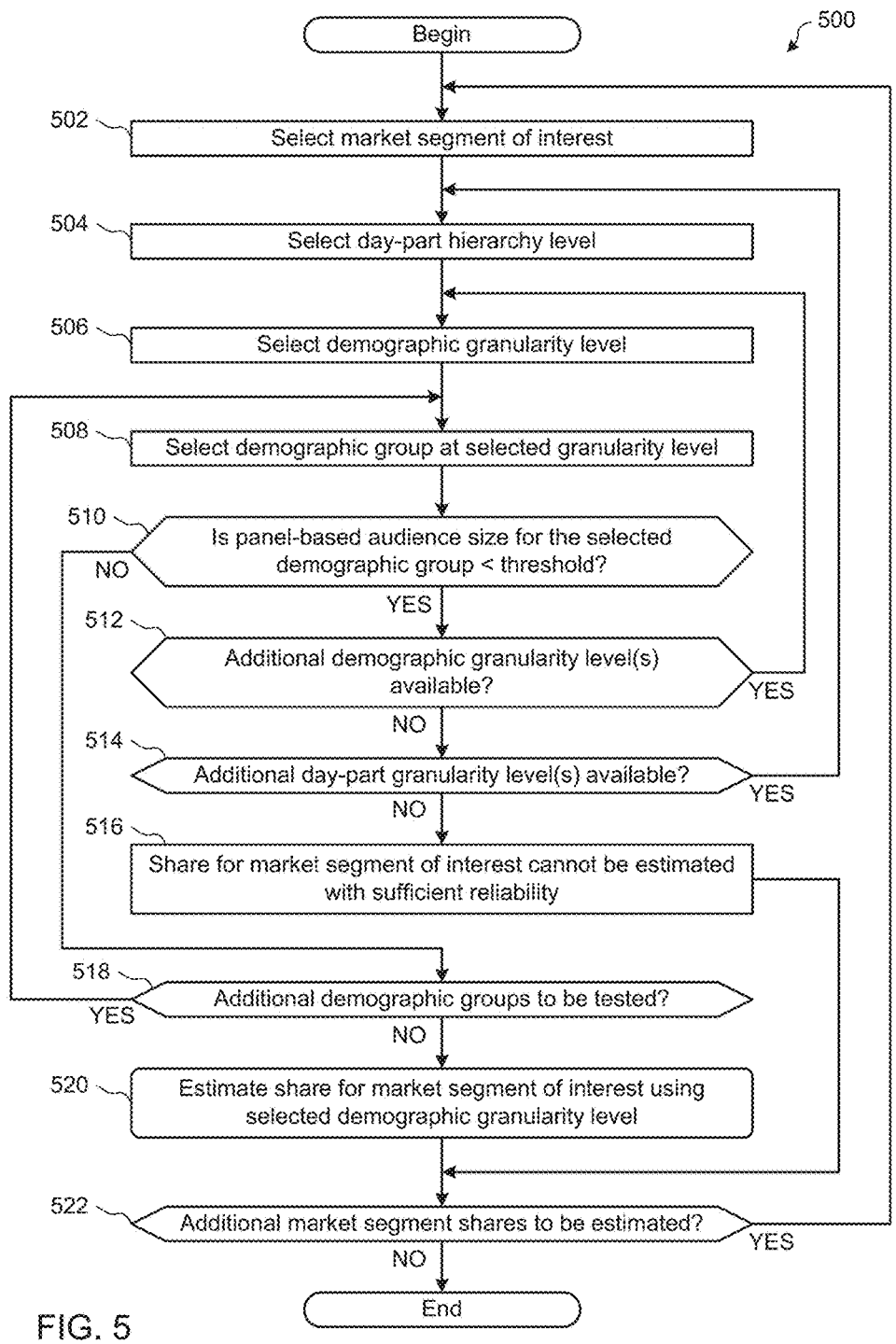
FIG. 5 is a flowchart representative of example alternative computer readable instructions which may be executed to implement the example impression monitoring server of FIGS. 1 and/or 2 to select a panel audience based on demographic groups and/or day-parts at multiple granularity levels to be used to attribute impressions to a market segment.
Figure 6:
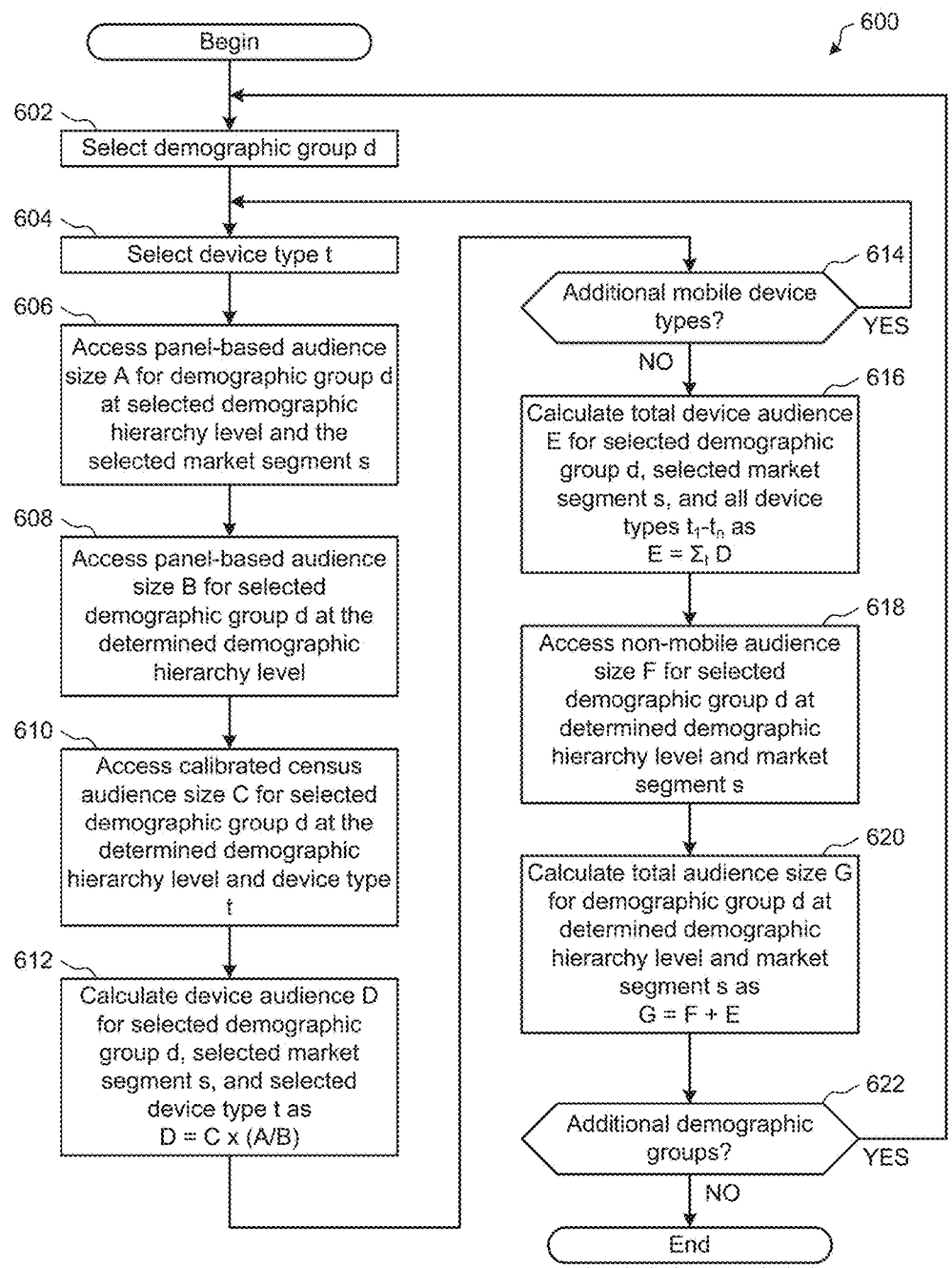
FIG. 6 is a flowchart representative of example alternative computer readable instructions which may be executed to implement the example impression monitoring server of FIGS. 1 and/or 2 to estimate a share for a market segment of interest using a selected demographic granularity level.

Flowcharts representative of example machine readable instructions for implementing the impression monitoring server 132 of FIGS. 1 and/or 2 are shown in FIGS. 4, 5, and 6. In this example, the machine readable instructions comprise program(s) for execution by a processor such as the processor 712 shown in the example processor platform 700 discussed below in connection with FIG. 7. The program(s) may be embodied in software stored on a tangible computer readable storage medium such as a CD-ROM, a floppy disk, a hard drive, a digital versatile disk (DVD), a Blu-ray disk, or a memory associated with the processor 712, but the entire program(s) and/or parts thereof could alternatively be executed by a device other than the processor 712 and/or embodied in firmware or dedicated hardware. Further, although the example program(s) are described with reference to the flowcharts illustrated in FIGS. 4, 5, and 6, many other methods of implementing the example impression monitoring server 132 may alternatively be used. For example, the order of execution of the blocks may be changed, and/or some of the blocks described may be changed, eliminated, or combined.

As mentioned above, the example processes of FIGS. 4, 5, and/or 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 4, 5, and/or 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 4 is a flowchart representative of example computer readable instructions 400 which may be executed to implement the example impression monitoring server 132 of FIGS. 1 and/or 2 to calculate a share of a market segment of interest by selecting a demographic granularity level based on comparing the panel audience size for the demographic granularity level to a threshold. In the example of FIG. 4, the precision determiner 206 of FIG. 2 selects a lowest granularity level that satisfies the sample size threshold for each demographic group, regardless of whether a higher level is used for another demographic group.

The example precision determiner 206 of FIG. 2 selects a market segment s of interest (block 402). For example, the selected market segment of interest may correspond to a particular demographic group, based on one or more demographic characteristics such as household income range, ethnicity, etc. The example precision determiner 206 selects a demographic group d at the lowest granularity level (block 404). For example, the selected demographic group may be the female, ages 2-5 demographic group of Table 3 above or a first demographic group of the building block demographic groups of Table 4 above. The example precision determiner 206 selects a demographic granularity level (block 406). In the example of FIG. 4, the precision determiner 206 first selects a lowest demographic granularity level for a selected demographic group d, and each subsequent iteration of block 406 for a selected demographic group uses a next-lowest demographic granularity level. For example, the demographic granularity level may be the Demographic Granularity Level 1 of Table 3 above or the Demographic Granularity Level 1 of Table 4 above.

The example precision determiner 206 determines whether the panel audience size (e.g., B of Table 1 above) at the selected demographic granularity level for the selected demographic group is less than a threshold (block 408). For example, the threshold may be a minimum sample size (e.g., a minimum number of people in an established audience measurement panel who belong to the demographic group audience) for the demographic group in the panel.

When the panel audience size is not less than (e.g., satisfies) the threshold (block 408), the example precision determiner 206 sets the selected demographic group d to use the panel audience at the selected demographic granularity level for attributing audience and/or impressions to a market segment s (block 410). In the illustrated example, the market segment s is the market segment of interest selected at block 402. For example, the precision determiner 206 may provide instructions to the market segment calculator 208 to use the panel audience at the selected demographic granularity level for determining A, B, and/or the ratio A/B, of Table 1 above to calculate D, E, and/or G of Table 1 above.

If the panel audience size is less than the threshold (block 408), the panel audience for the demographic granularity level selected at block 406 will not be used to attributed collected impressions to the market segment s selected at block 402. In such an instance, the example precision determiner 206 determines whether there are additional demographic granularity levels (block 412). If there are additional demographic granularity levels (block 412), the example returns to block 406 to select another demographic granularity level. For example, the precision determiner 206 may select a next-lowest demographic granularity level relative to the previously-selected demographic granularity level, such as Demographic Granularity Level 4 of Table 3 above or the Demographic Granularity Level 4 of Table 4 above.

If there are no additional demographic granularity levels (block 412), the example precision determiner 206 determines that the share for the market segment of interest cannot be estimated with sufficient reliability for the selected demographic group d (block 414). For example, because a sufficient sample size cannot be obtained for one or more demographic groups for the market segment of interest, the precision of any calculated audience size or impression count may be considered to be unacceptably low.

After setting the selected demographic group d to use the panel audience at the selected demographic granularity level (block 410), or after determining that the share for the market segment s cannot be estimated with sufficient reliability (block 414), the precision determiner 206 determines whether there are additional demographic groups to be tested for the selected market segment of interest (block 416). If there are additional demographic groups to be tested for the selected market segment of interest (block 416), control returns to block 404 to select another demographic group (e.g., the demographic group female, ages 6-8 of Table 3 above, a second one of the BB demographic groups of Table 4 above, etc.).

When there are no more demographic groups to be tested (e.g., all of the demographic groups have been assigned a demographic granularity level and/or a corresponding panel audience size) (block 416), the example market segment calculator 208 of FIG. 2 determines the share for the market segment of interest (e.g., the portion of collected impressions or audience size that is attributable to the market segment of interest from a total number of collected impressions or total audience size) using the selected demographic granularity level (block 418). For example, the market segment calculator 208 of FIG. 2 may determine the mobile audience E (e.g., the share for the selected market segment) of Table 1 above using the selected panel audiences in the selected demographic granularity level. Example instructions to implement block 418 to estimate the share for a market segment (e.g., the portion(s) of the impression count(s) or audience size(s) attributable to the market segment) are described with reference to FIG. 6 below.

The example precision determiner 206 determines whether additional market segment shares are to be estimated (block 420). If there are additional market segment shares to be estimated (block 420), the example returns to block 402 to select another market segment of interest. When there are no more market segment shares to be estimated (block 420), the example instructions 400 end.

FIG. 5 is a flowchart representative of example computer readable instructions 500 which may be executed to implement the example impression monitoring server 132 of FIGS. 1 and/or 2 to calculate a share of a market segment of interest (e.g., the portion of collected impressions or audience size that is attributable to the market segment of interest from a total number of collected impressions or total audience size) by selecting a demographic granularity level based on comparing the panel audience size for the demographic granularity level to a threshold.

The example precision determiner 206 selects a market segment of interest (block 502). For example, the selected market segment of interest may be defined by one or more particular demographic attributes such as household income range, ethnicity, etc. The example precision determiner 206 selects a day-part granularity level (block 504). For example, the day-part granularity level may be a particular day/station/¼ hour combination as discussed above with reference to Table 4.

The example precision determiner 206 selects a demographic granularity level (block 506). For example, the demographic granularity level may be the Demographic Granularity Level 1 of Table 3 above or the Demographic Granularity Level 1 of Table 4 above. The example precision determiner 206 selects a demographic group in the selected granularity level (block 508). For example, the selected demographic group may be the female, ages 2-5 demographic group of Table 3 above or a first demographic group of the BB demographic groups of Table 4 above.

The example precision determiner 206 determines whether the panel audience size (e.g., B of Table 1 above) for the selected demographic group is less than a threshold (block 510). For example, the threshold may be a minimum sample size for the demographic group in the panel. If the panel audience size for the selected demographic group is less than a threshold (block 510), the example precision determiner 206 determines whether there are additional demographic granularity levels (block 512). If there are additional demographic granularity levels (block 512), control returns to block 506 to select another demographic granularity level. For example, a next demographic granularity level, such as Demographic Granularity Level 2 of Table 3 above or the Demographic Granularity Level 2 of Table 4 above, may be selected.

If there are no additional demographic granularity levels (block 512), the example precision determiner 206 determines whether there are additional day-part granularity level(s) available (block 514). For example, a day/station/½ hour granularity level may be used. If there are additional day-part granularity level(s) available (block 514), control returns to block 504 to select another day-part granularity level.

When there are no more day-part granularity level(s) available (block 514), the example precision determiner 206 determines that the share of impressions for the selected market segment of interest cannot be estimated with sufficient reliability (block 516). For example, because a sufficient sample size cannot be obtained for one or more demographic groups for the selected market segment of interest, the precision of any calculated audience or impressions may be considered to be unacceptably low.

If, in block 510, the panel audience size for the selected demographic group is not less than a threshold, the example precision determiner 206 determines whether there are additional demographic groups to be tested at the selected demographic granularity level (block 518). If there are additional demographic groups to be tested at the selected demographic granularity level (block 518), control returns to block 508 to select another demographic group (e.g., the demographic group female, ages 6-8 of Table 3 above, a second one of the BB demographic groups of Table 4 above, etc.).

When there are no more demographic groups to be tested at the selected demographic granularity level (e.g., all of the demographic groups at the selected granularity level have at least a threshold panel audience size) (block 518), the example market segment calculator 208 estimates the share for the market segment of interest using the selected demographic granularity level (block 520). For example, the market segment calculator 208 may estimate the mobile audience E of Table 1 above using the demographic groups in the selected demographic granularity level. Example instructions that may be executed to estimate the mobile audience E of Table 1 above are described below with reference to FIG. 6.

After estimating the share of the market segment of interest (block 520), or if the share cannot be estimated with sufficient reliability (block 516), the example market segment calculator 208 determines whether additional market segment shares are to be estimated (block 522). If there are additional market segment shares to be estimated (block 522), control returns to block 502 to select another market segment of interest. When there are no more market segment shares to be estimated (block 522), the example instructions 500 end.

FIG. 6 is a flowchart representative of example computer readable instructions 600 which may be executed to implement the example impression monitoring server 132 of FIGS. 1 and/or 2 to estimate a share for a market segment of interest using a selected demographic granularity level. The example instructions 600 of FIG. 6 may be performed by the example market segment calculator 208 of FIG. 2 to implement block 418 of FIG. 4 and/or block 520 of FIG. 5 to estimate a share for a market segment of interest using a selected demographic granularity level (e.g., a demographic granularity level selected at block 406 of FIG. 4 or block 506 of FIG. 5).

The example market segment calculator 208 selects a demographic group (e.g., a demographic group d as described above with reference to Table 1) (block 602). The market segment calculator 208 also selects a device type t (e.g., a device type t as described above with reference to Table 1) (block 604).

The example market segment calculator 208 accesses a panel audience size for the demographic group d at a selected demographic granularity level and the selected market segment s (e.g., A as described with reference to Table 1 above) (block 606). The market segment s was previously selected by the precision determiner 206 in block 402 of FIG. 4 or in block 502 of FIG. 5, and the demographic granularity level was previously determined in blocks 404 and 408 of FIG. 4 or in blocks 506 and 510 of FIG. 5.

The market segment calculator 208 of this example also accesses a panel based audience size for the demographic group d at the selected demographic granularity level (e.g., B as described with reference to Table 1 above) (block 608).

The example market segment calculator 208 further accesses a calibrated census audience size for the selected demographic group d at the determined demographic granularity level and the selected device type t (e.g., C as described with reference to Table 1 above) (block 610). For example, the market segment calculator 208 may obtain the calibrated census audience size C from the demographics determiner 204 of FIG. 2 that includes a number of impressions and/or an audience size that is attributable to the selected demographic group d and the device type t.

The example market segment calculator 208 calculates a device audience for the selected demographic group d, the selected market segment s, and the selected device type t (e.g., D as described with reference to Table 1 above) (block 612). For example, the market segment calculator 208 may calculate the device audience D using the formula $D=C \times (A/B)$, which applies the ratio or percentage of the market segment to the panelists in the selected demographic group d to the number of impressions and/or audience size attributed to the selected demographic group d by the demographics determiner 204.

The example market segment calculator 208 determines whether there are additional mobile device types t for which to calculate a device audience D (block 614). If there are additional device types (block 614), control returns to block 604 to select a next device type. When there are no more device types (block 614), the example market segment calculator 208 calculates a total device audience (e.g., E of Table 1 discussed above) for the selected demographic group d, the selected market segment s, and all device types $t_1$-$t_n$ (e.g., devices types for which a device audience D was calculated) (block 616). For example, the market segment calculator 208 may calculate the total device audience E using the formula $E=\Sigma_t D$, or the summation of D over all device types t.

The example market segment calculator 208 accesses the non-mobile audience size F for the selected demographic group d at the determined demographic granularity level and the selected market segment s (e.g., F as described above with reference to Table 1) (block 618). For example, when the total device audience E calculated in block 616 represents only mobile devices, the market segment calculator 208 may access the audience for one or more non-mobile device types (e.g., television, radio, desktop computer, etc.).

The example market segment calculator 208 calculates a total audience size for the demographic group d at the determined demographic granularity level and for the market segment s (e.g., G as described above with reference to Table 1) (block 620). For example, the market segment calculator 208 may calculate the total audience size G using the formula $G=F+E$. The resulting total audience size and/or number of impressions G may be used as a cross-platform ratings measure and/or an audience measurement.

The example market segment calculator 208 determines whether there are additional demographic groups for which to calculate total audience size G (block 622). For example, the market segment calculator 208 may calculate the device audience (block 616) and/or the total audience (block 620) for multiple demographic groups. If there are additional demographic groups (block 622), control returns to block 602 to select another demographic group d. When there are no additional demographic groups (block 622), the example instructions 600 end and control returns to a calling function such as block 418 of FIG. 4 and/or block 520 of FIG. 5.

Figure 7:
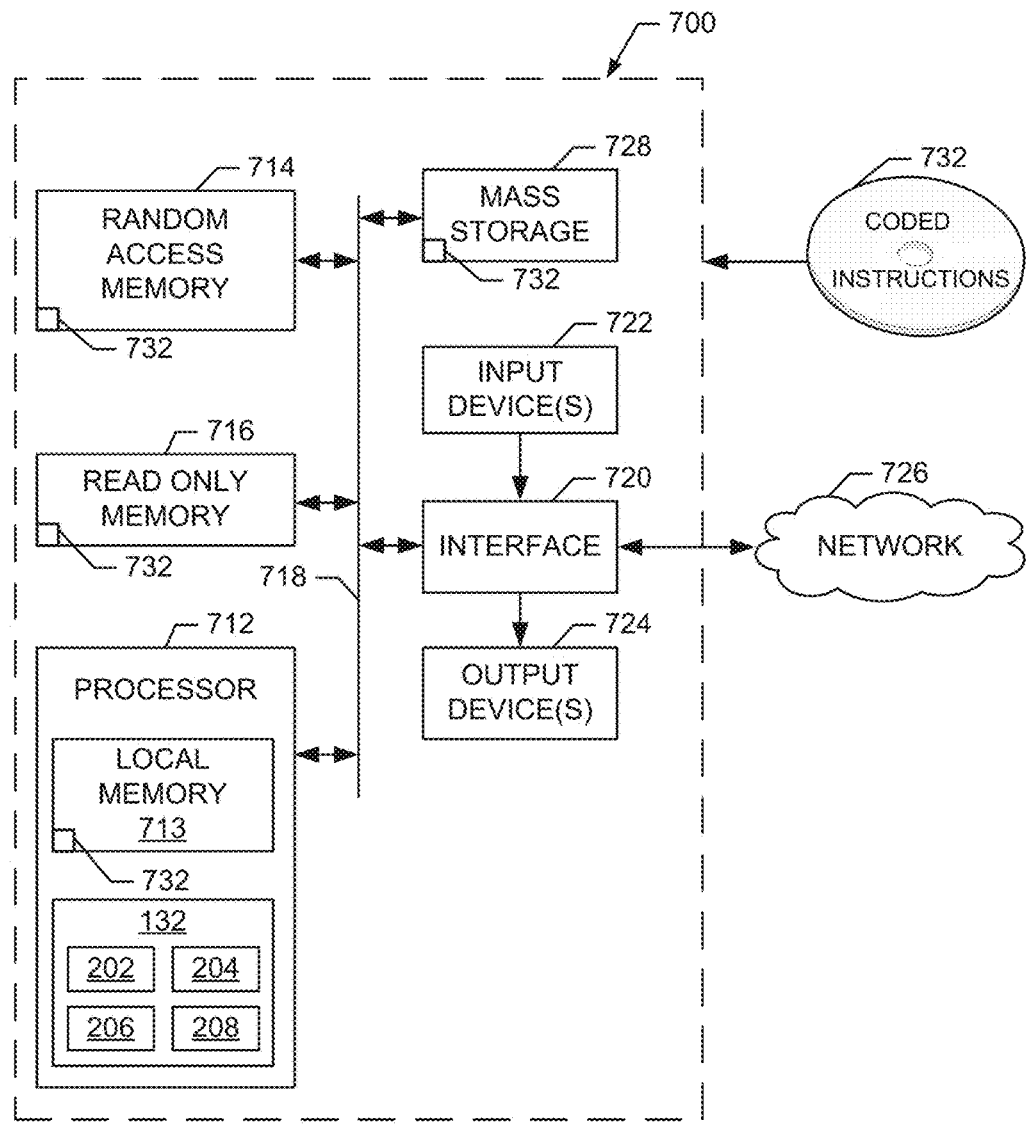
FIG. 7 is a block diagram of an example processor platform structured to execute the instructions of FIGS. 4, 5, and/or 6 to implement the impression monitoring server of FIGS. 1 and/or 2.

FIG. 7 is a block diagram of an example processor platform 700 capable of executing the instructions of FIGS. 4, 5, and/or 6 to implement the example impression collector 202, the example demographics determiner 204, the example precision determiner 206, the example market segment calculator 208 and/or, more generally, the impression monitoring server 132 of FIGS. 1 and/or 2. The processor platform 700 can be, for example, a server, a personal computer, a mobile device (e.g., a cell phone, a smart phone, a tablet such as an iPad™), or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer. The example processor 712 of FIG. 7 implements the example impression collector 202, the example demographics determiner 204, the example precision determiner 206, the example market segment calculator 208 and/or, more generally, the impression monitoring server 132 of FIGS. 1 and/or 2.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a Peripheral Component Interconnect (PCI) express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIGS. 4, 5, and/or 6 may be stored in the mass storage device 728, in the volatile memory 714, in the non-volatile memory 716, and/or on a removable tangible computer readable storage medium such as a CD or DVD.

From the foregoing, it will be appreciated that methods, apparatus and articles of manufacture have been disclosed which enhance the operations of a computer to improve the attribution accuracy of distribution of impression-based data such as unique audience sizes, impression counts, and duration units to market segments so that computers and processing systems therein can be relied upon to produce audience analysis information with higher accuracies. In some examples, computer operations can be made more efficient based on the above equations and techniques for attributing unique audience sizes, impression counts, and/or duration units to market segments. That is, through the use of these processes, computers can operate more efficiently by relatively quickly determining parameters and applying those parameters through the above disclosed techniques to determine the correct attributions. For example, using example processes disclosed herein, a computer can more efficiently and effectively attribute impressions, audience sizes, and/or durational units in development or test data logged by the AME 108 and the database proprietors 104a-b without using large amounts of network communication bandwidth (e.g., conserving network communication bandwidth) and without using large amounts of computer processing resources (e.g., conserving processing resources) to continuously communicate with individual online users (e.g., non-panel online users) to request survey responses about their online media access habits and personal details (e.g., personal details relating to which market segment(s) they belong) and without needing to rely on such continuous survey responses from such online users. Survey responses from online users can be inaccurate due to inabilities or unwillingness of users to recollect online media accesses and/or to divulge personal details for audience measurement purposes. Survey responses can also be incomplete, which could require additional processor resources to identify and supplement incomplete survey responses. As such, examples disclosed herein more efficiently and effectively attribute of impressions, unique audience sizes, and/or durational units to market segments. Such corrected data is useful in subsequent processing for identifying exposure performances of different media so that media providers, advertisers, product manufacturers, and/or service providers can make more informed decisions on how to spend advertising dollars and/or media production and distribution dollars.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
obtaining, at a first Internet domain, first requests from mobile devices, the first requests indicative of media impressions at the mobile devices;
requesting demographic information from a database proprietor, the demographic information corresponding to the first requests;
determining, by executing an instruction with a processor, a number of the media impressions that occurred on the mobile devices and that are attributable to a first demographic group, the number of the media impressions being based on attributions of the media impressions to the first demographic group by the database proprietor in the demographic information;
determining, by executing an instruction with the processor, whether a first size of a first audience that corresponds to the first demographic group satisfies a threshold, the first audience including panelists in an audience measurement panel maintained by an audience measurement entity;
when the first size of the first audience does not satisfy the threshold, determining, by executing an instruction with the processor, whether a second size of a second audience satisfies the threshold, the second audience including panelists in the audience measurement panel and corresponding to a second demographic group, the first audience being a subset of the second audience and the first demographic group being a subset of the second demographic group; and
when the second size of the second audience satisfies the threshold, conserving at least one of computing resources or network resources by executing an instruction with the processor to calculate a portion of the media impressions attributable to a market segment and to the second demographic group based on a portion of the second audience that belongs to the market segment, without using computer processing resources to continuously communicate with non-panel online users to request survey responses about personal information related to the market segment.

2. The method as defined in claim 1, wherein the threshold includes a minimum number of panel members.

3. The method as defined in claim 1, wherein the first demographic group includes one of multiple age and gender groups, and the second demographic group includes a combination of the multiple age and gender groups.

4. The method as defined in claim 1, wherein the audience measurement panel includes a television audience measurement panel.

5. The method as defined in claim 1, further including:
determining whether a size of a third audience that corresponds to a third demographic group satisfies the threshold, the third audience including panelists in the audience measurement panel, the third audience being a subset of the second audience, and the third demographic group being a subset of the second demographic group; and
when the size of the third audience satisfies the threshold and the size of the first audience does not satisfy the threshold:
calculating a second portion of the media impressions attributable to both the market segment and the third demographic group based on a portion of the third audience that belongs to the market segment; and
calculating a portion of the media impressions attributable to both the market segment and the first demographic group based on the portion of the second audience that belongs to the market segment.

6. The method as defined in claim 1, wherein calculating the portion of the media impressions further includes multiplying a) the portion of the second audience belonging to the market segment and b) an audience size for the second demographic group, the second demographic group determined based on i) the demographic information obtained from the database proprietor and ii) a second number of second media impressions counted at an impression collector, to calculate a portion of the second audience that belongs to both the market segment and the second demographic group.

7. The method as defined in claim 6, wherein calculating the portion of the media impressions further includes multiplying an impression frequency corresponding to the second demographic group and the portion of the second audience that belongs to both the market segment and the second demographic group.

8. An apparatus, comprising:
an impression collector to:
receive, at a first Internet domain, first requests from mobile devices, the first requests indicative of media impressions at the mobile devices;
request demographic information from a database proprietor, the demographic information corresponding to the first requests;
a demographics determiner to determine a number of the media impressions that occurred on the mobile devices and that are attributable to a first demographic group, the number of the media impressions being based on attributions of the media impressions to the first demographic group by the database proprietor in the demographic information;
a precision determiner to:
determine whether a first size of a first audience that corresponds to the first demographic group satisfies a threshold, the first audience including panelists in an audience measurement panel maintained by an audience measurement entity; and
when the first size of the first audience does not satisfy the threshold, determine whether a second size of a second audience satisfies the threshold, the second audience including panelists in the audience measurement panel and corresponding, to a second demographic group, the first audience being a subset of the second audience and the first demographic group being a subset of the second demographic group; and
a market segment calculator to, when the second size of the second audience satisfies the threshold, conserve at least one of computing resources or network resources by executing an instruction with a processor to calculate a portion of the media impressions attributable to a market segment and to the second demographic group based on a portion of the second audience that belongs to the market segment, without using computer processing resources to continuously communicate with non-panel online users to request survey responses about personal information related to the market segment.

9. The apparatus as defined in claim 8, wherein the threshold includes a minimum audience size.

10. The apparatus as defined in claim 8, wherein the first demographic group includes one of multiple age and gender groups, and the second demographic group includes a combination of the multiple age and gender groups.

11. The apparatus as defined in claim 8, wherein the audience measurement panel includes a television audience measurement panel.

12. The apparatus as defined in claim 8, wherein the precision determiner is to determine whether a third size of a third audience that corresponds to a third demographic group satisfies the threshold, the third audience including panelists in the audience measurement panel, the third audience being a subset of the second audience, and the third demographic group being a subset of the second demographic group; and
- the market segment calculator is to, when the third size of the third audience satisfies the threshold and the first size of the first audience does not satisfy the threshold:
  - calculate a second portion of the media impressions attributable to both the market segment and the second demographic group based on a portion of the third audience that belongs to the market segment; and
  - calculate a portion of the media impressions attributable to both the market segment and the first demographic group based on the portion of the second audience that belongs to the market segment.

13. The apparatus as defined in claim 8, wherein the market segment calculator is to calculate the portion of the media impressions by further multiplying a) the portion of the second audience belonging to the market segment and b) an audience size for the second demographic group determined based on i) the demographic information obtained from the database proprietor and ii) a second number of second media impressions counted at the impression collector, to calculate a portion of the second audience that belongs to both the market segment and the second demographic group.

14. The apparatus as defined in claim 13, wherein the market segment calculator is to calculate the portion of the media impressions by further multiplying an impression frequency corresponding to the second demographic group and the portion of the second audience that belongs to both the market segment and the second demographic group.

15. A tangible computer readable storage medium comprising computer readable instructions which, when executed, cause a processor to at least:
- access, at a first Internet domain, first requests from mobile devices, the first requests indicative of media impressions at the mobile devices;
- request demographic information from a database proprietor, the demographic information corresponding to the first requests;
- determine a number of the media impressions that occurred on the mobile devices and that are attributable to a first demographic group, the number of the media impressions being based on attributions of the media impressions to the first demographic group by the database proprietor in the demographic information;
- determine whether a first size of a first audience that corresponds to the first demographic group satisfies a threshold, the first audience including panelists in an audience measurement panel maintained by an audience measurement entity;
- when the first size of the first audience does not satisfy the threshold, determine whether a second size of a second audience satisfies the threshold, the second audience including panelists in the audience measurement panel and corresponding to a second demographic group, the first audience being a subset of the second audience and the first demographic group being a subset of the second demographic group; and
- when the second size of the second audience satisfies the threshold, conserve at least one of computing resources or network resources by calculating a portion of the media impressions attributable to a market segment and to the second demographic group based on a portion of the second audience that belongs to the market segment, without using computer processing resources to continuously communicate with non-panel online users to request survey responses about personal information related to the market segment.

16. The tangible computer readable storage medium as defined in claim 15, wherein the instructions are further to cause the processor to:
- determine whether a size of a third audience that corresponds to a third demographic group satisfies the threshold, the third audience including panelists in the audience measurement panel, the third audience being a subset of the second audience, and the third demographic group being a subset of the second demographic group; and
- when the size of the third audience satisfies the threshold and the size of the first audience does not satisfy the threshold:
  - calculate a second portion of the media impressions attributable to both the market segment and the third demographic group based on a portion of the third audience that belongs to the market segment; and
  - calculate a portion of the media impressions attributable to both the market segment and the first demographic group based on the portion of the second audience that belongs to the market segment.

17. The tangible computer readable storage medium as defined in claim 15, wherein the instructions are to further cause the processor to calculate the portion of the media impressions by multiplying a) the portion of the second audience belonging to the market segment and b) an audience size for the second demographic group, the second demographic group determined based on i) the demographic information obtained from the database proprietor and ii) a second number of second media impressions counted at an impression collector, to calculate a portion of the second audience that belongs to both the market segment and the second demographic group.

18. The tangible computer readable storage medium as defined in claim 17, wherein the instructions are further to cause the processor to calculate the portion of the media impressions by multiplying an impression frequency corresponding to the second demographic group and the portion of the second audience that belongs to both the market segment and the second demographic group.

19. The tangible computer readable storage medium as defined in claim 15, wherein the threshold includes a minimum audience size.

20. The tangible computer readable storage medium as defined in claim 15, wherein the first demographic group includes one of multiple age and gender groups, and the second demographic group includes a combination of the multiple age and gender groups.

* * * * *